FIG: 9
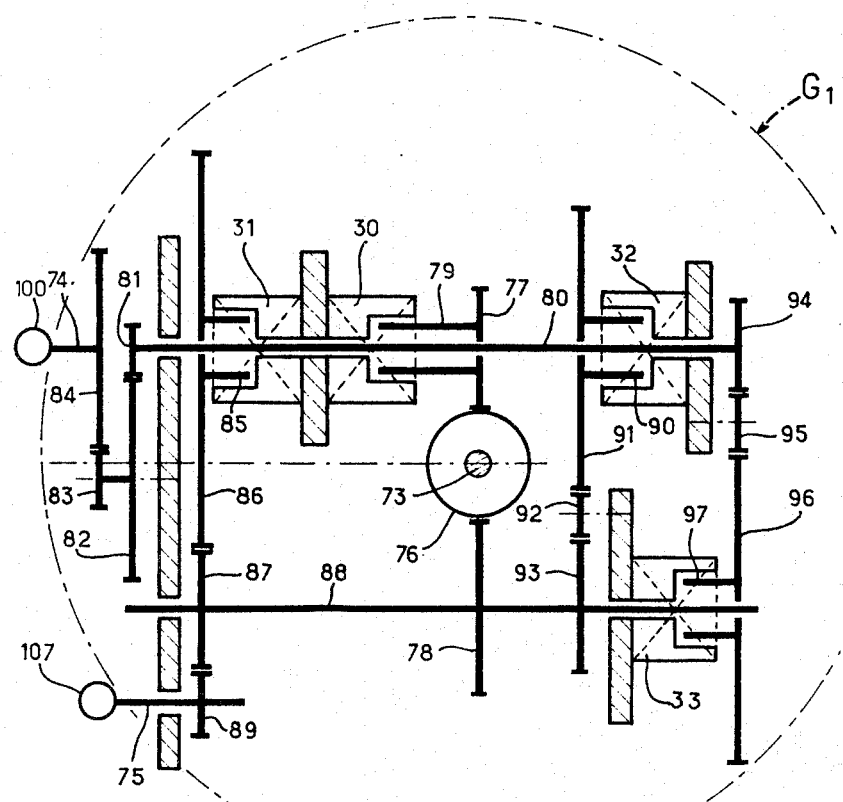

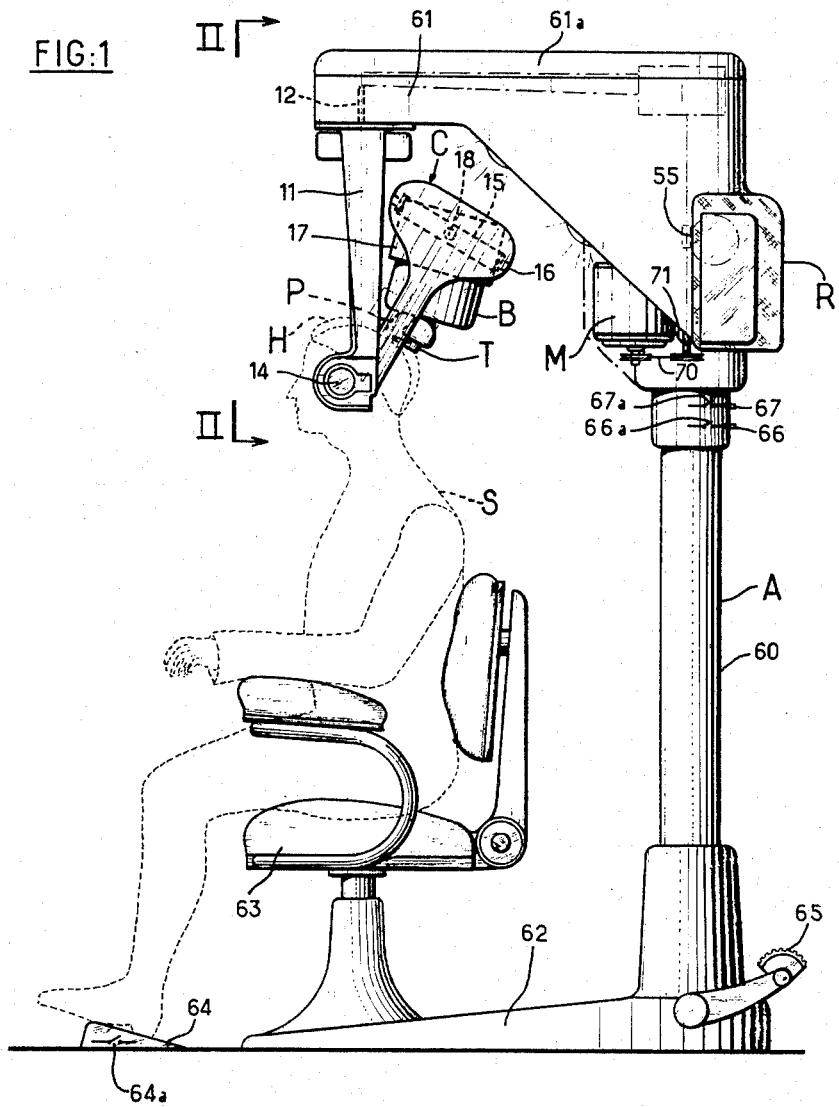

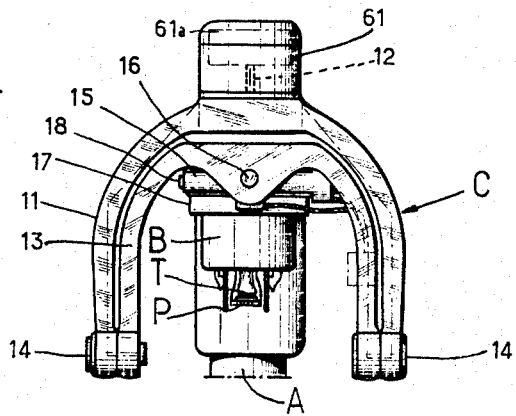
FIG:2
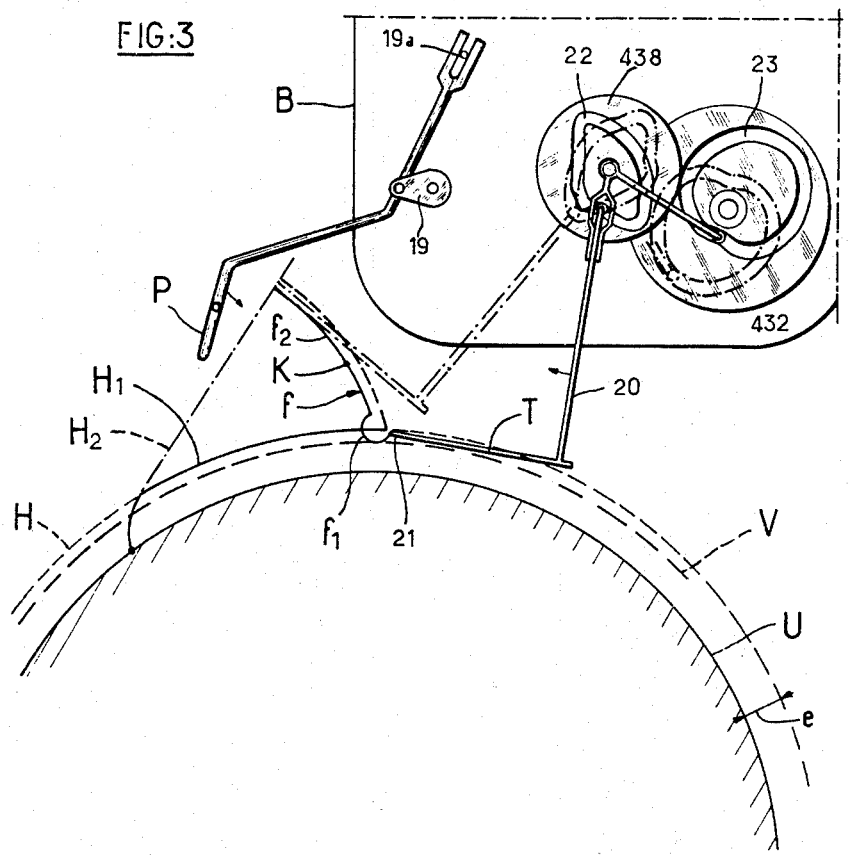
FIG:3

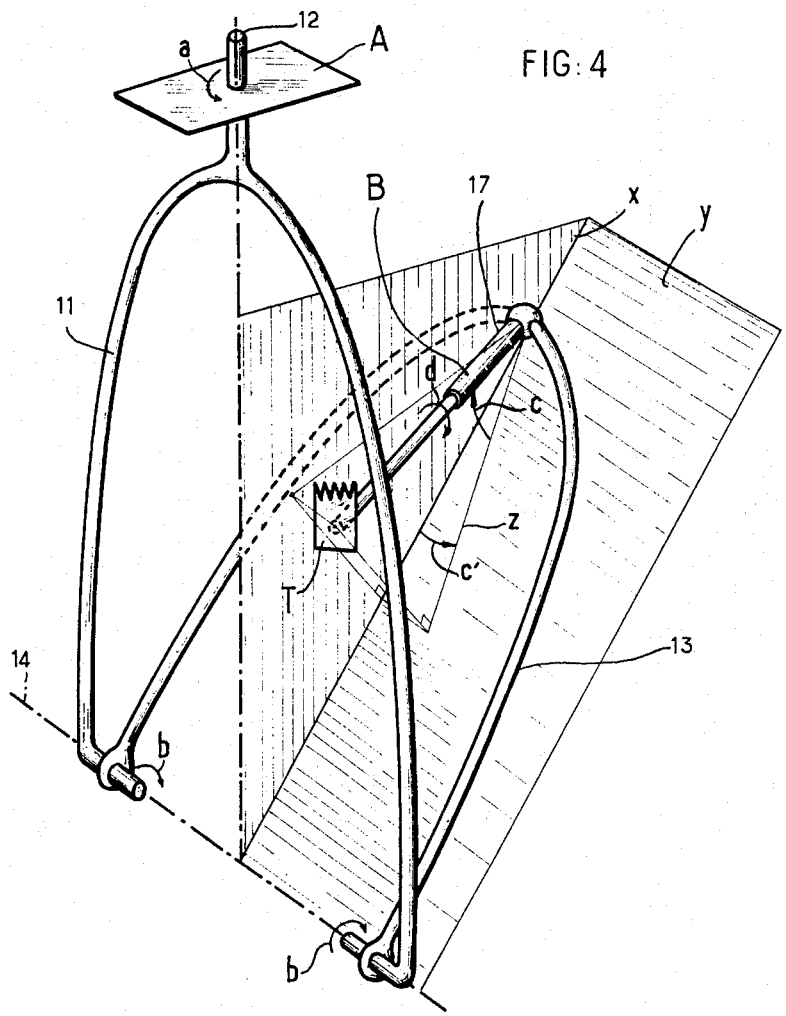
FIG: 4
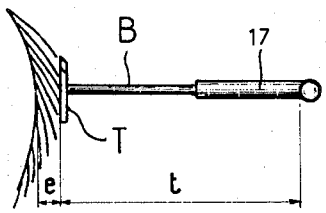
FIG: 5

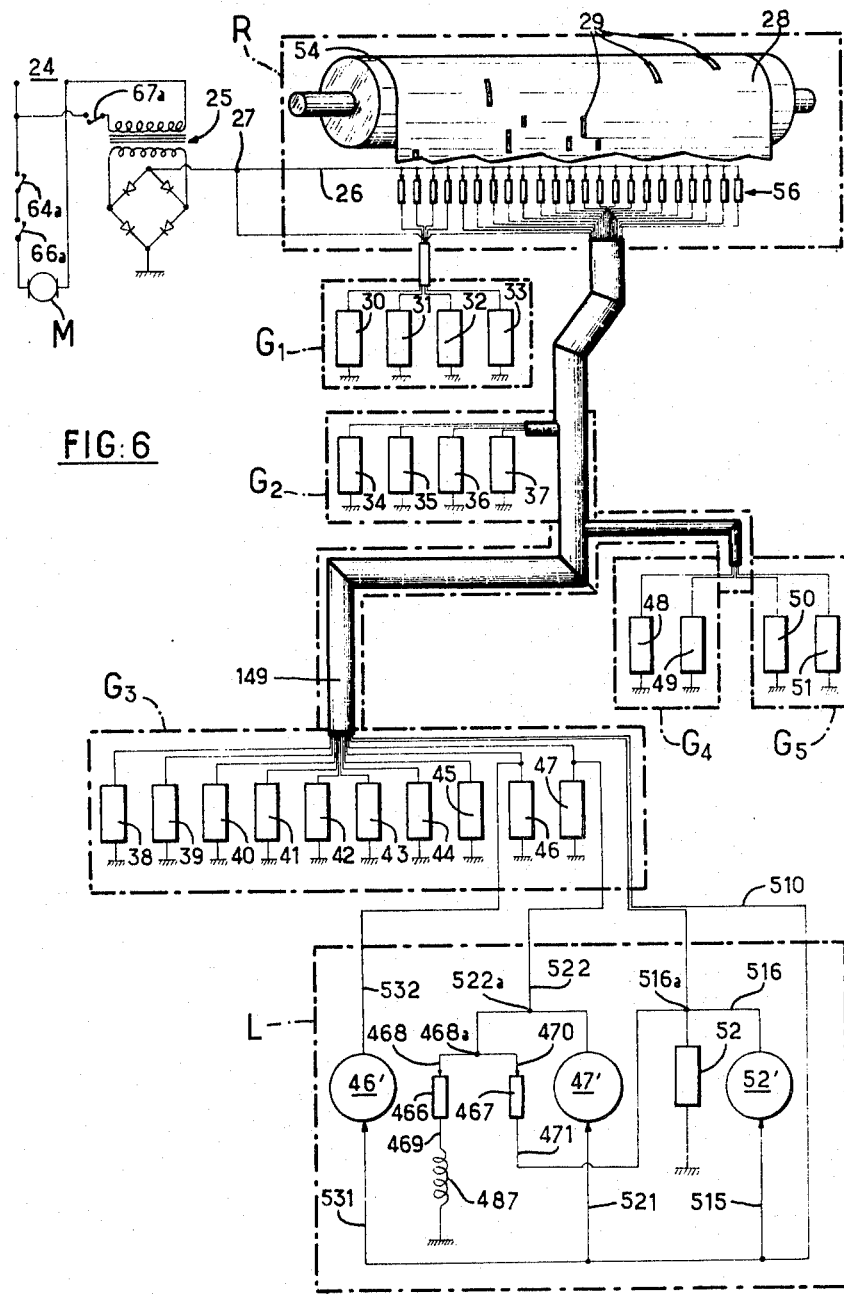

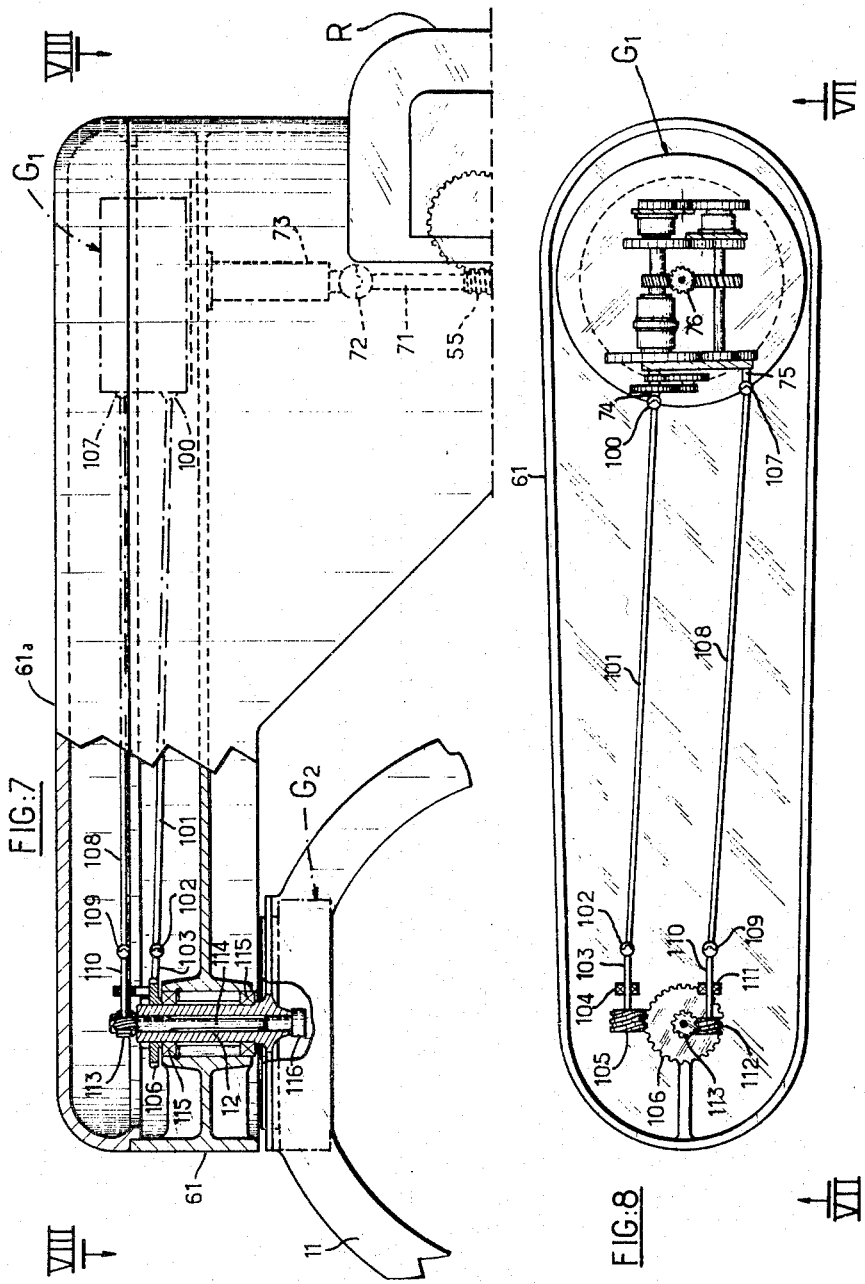

FIG:10
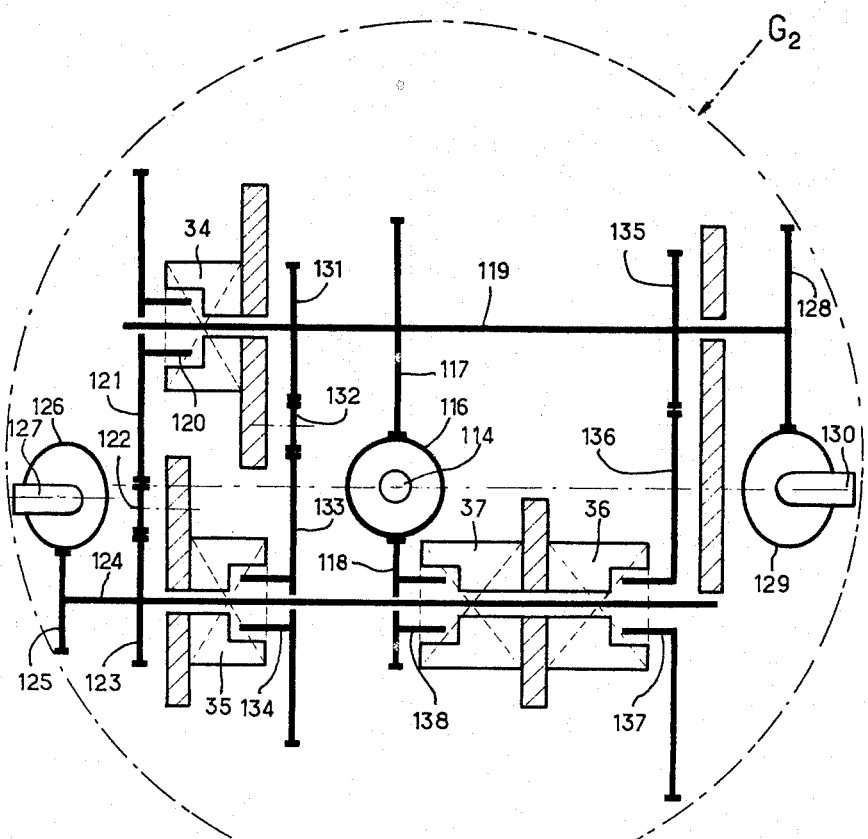

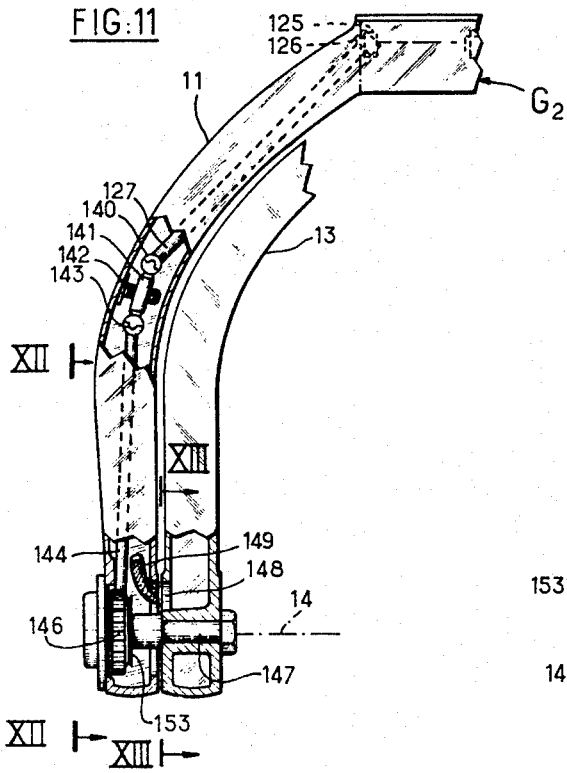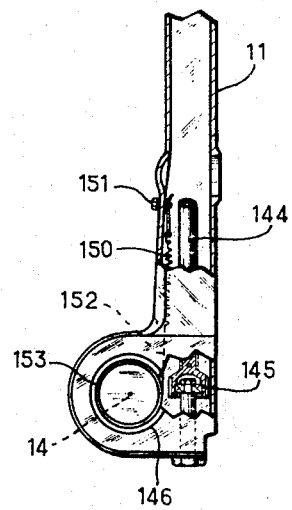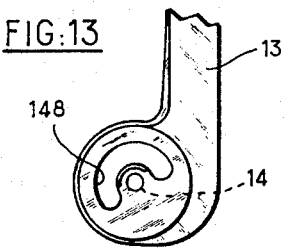

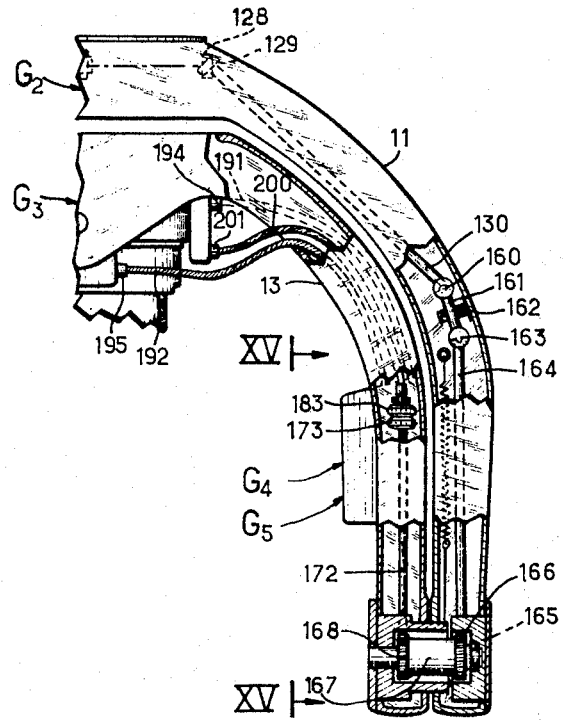
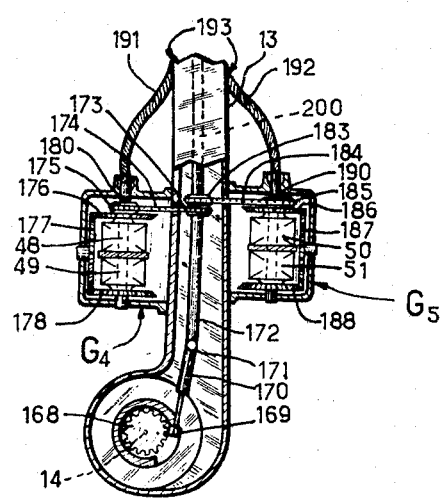

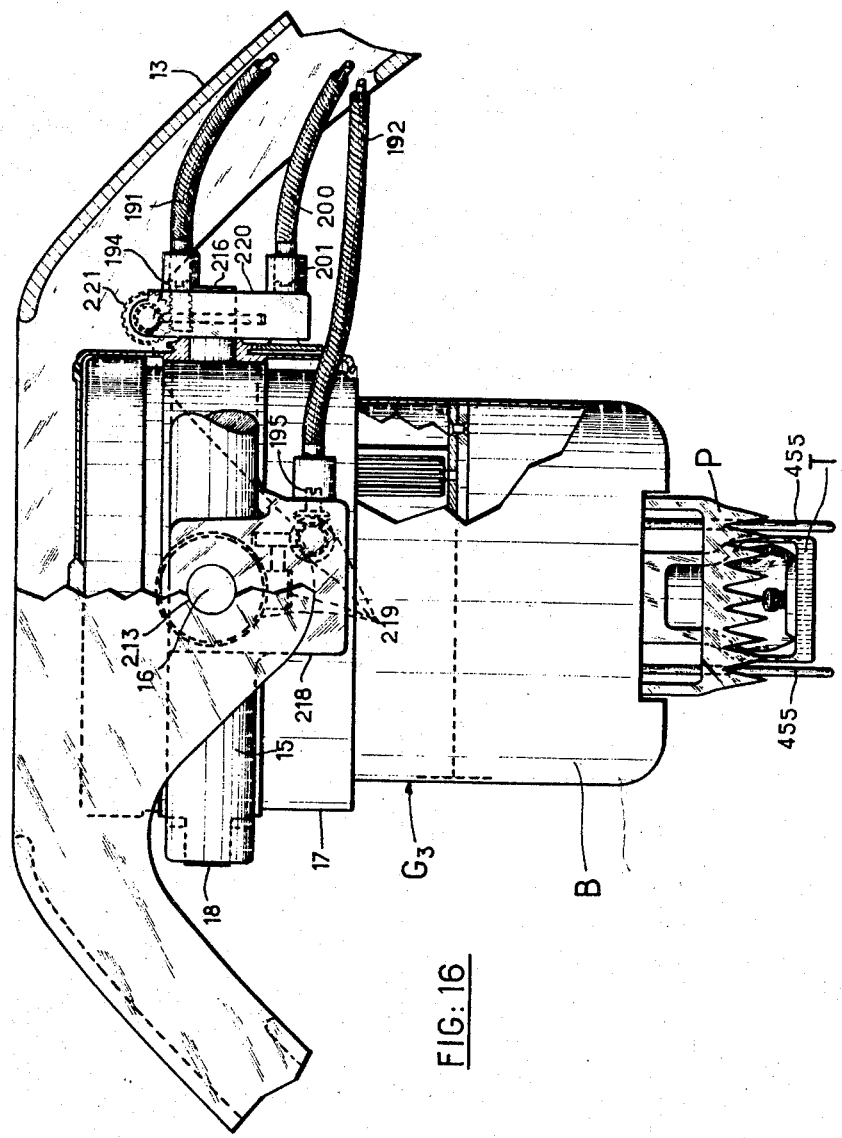

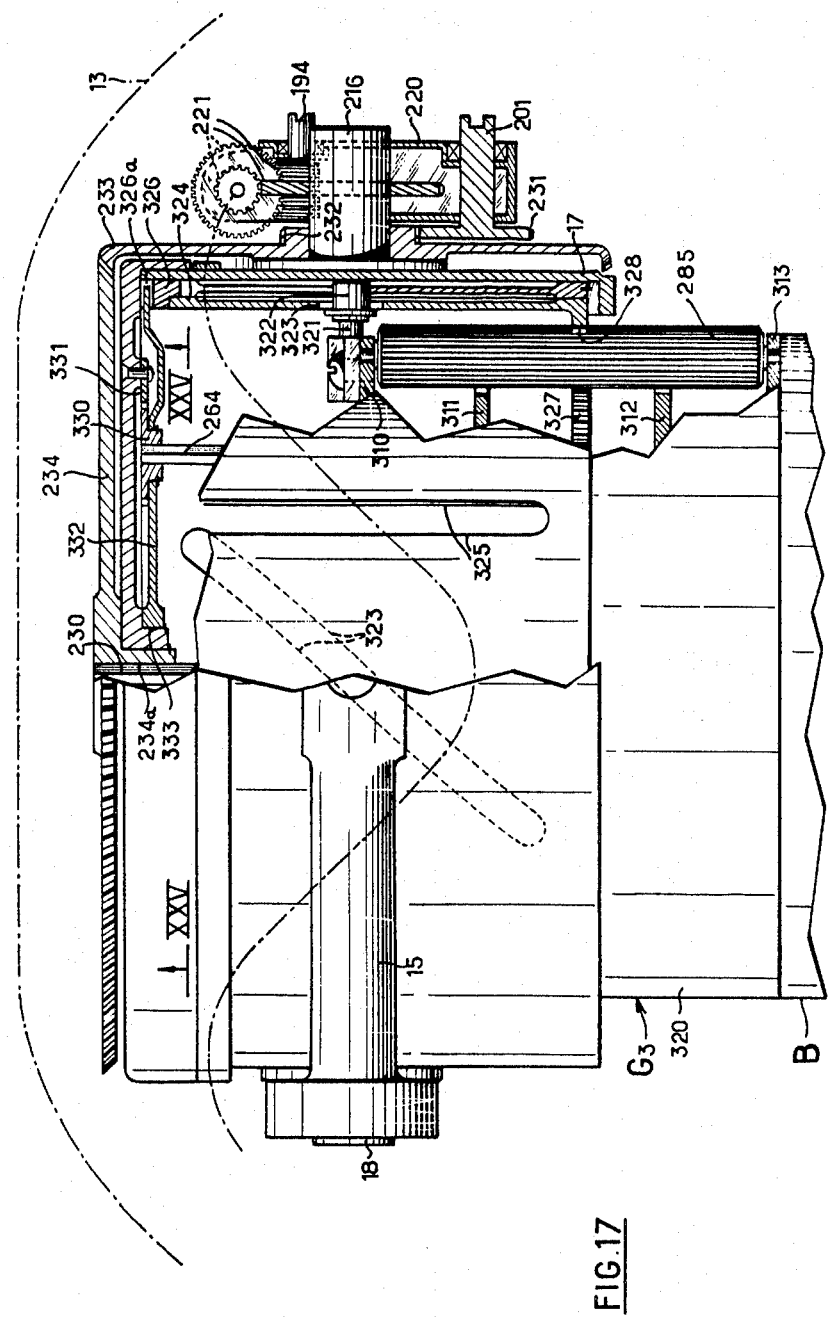

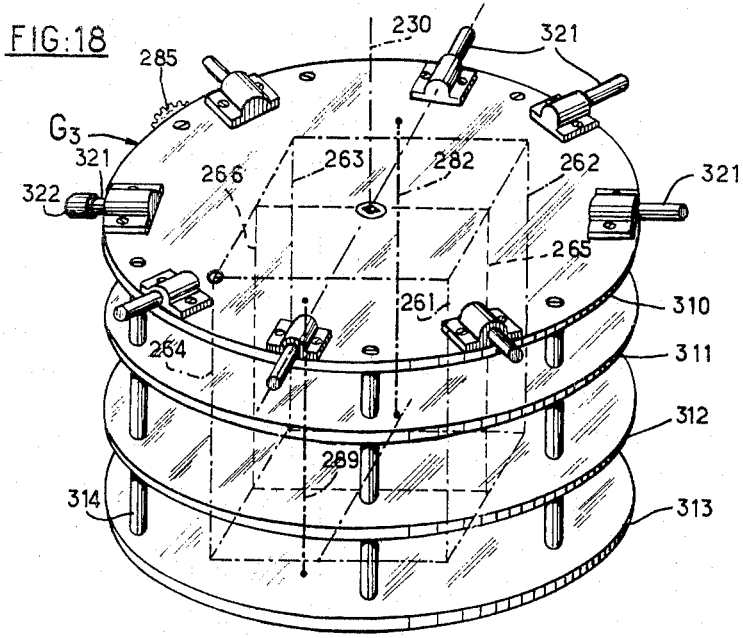
FIG:18
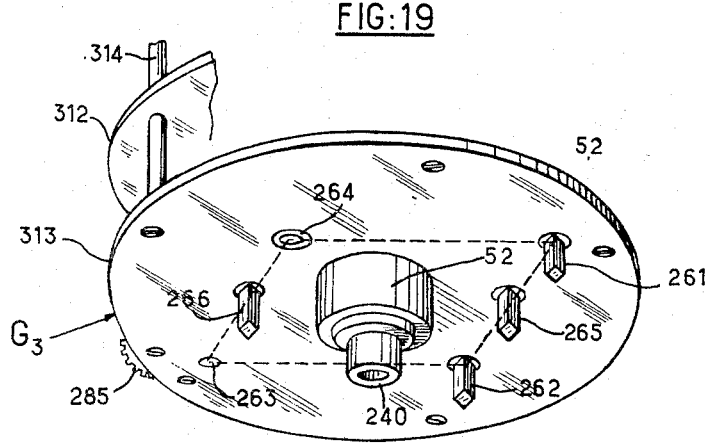
FIG:19

March 22, 1966  J. GRONIER  3,241,562
AUTOMATIC HAIR-CUTTING MACHINE HAVING PROGRAMMED CONTROL
MEANS FOR CUTTING HAIR IN A PREDETERMINED STYLE
Filed Feb. 10, 1961  21 Sheets-Sheet 13

INVENTOR
JEAN GRONIER
By Irwin S. Thompson
ATTY.

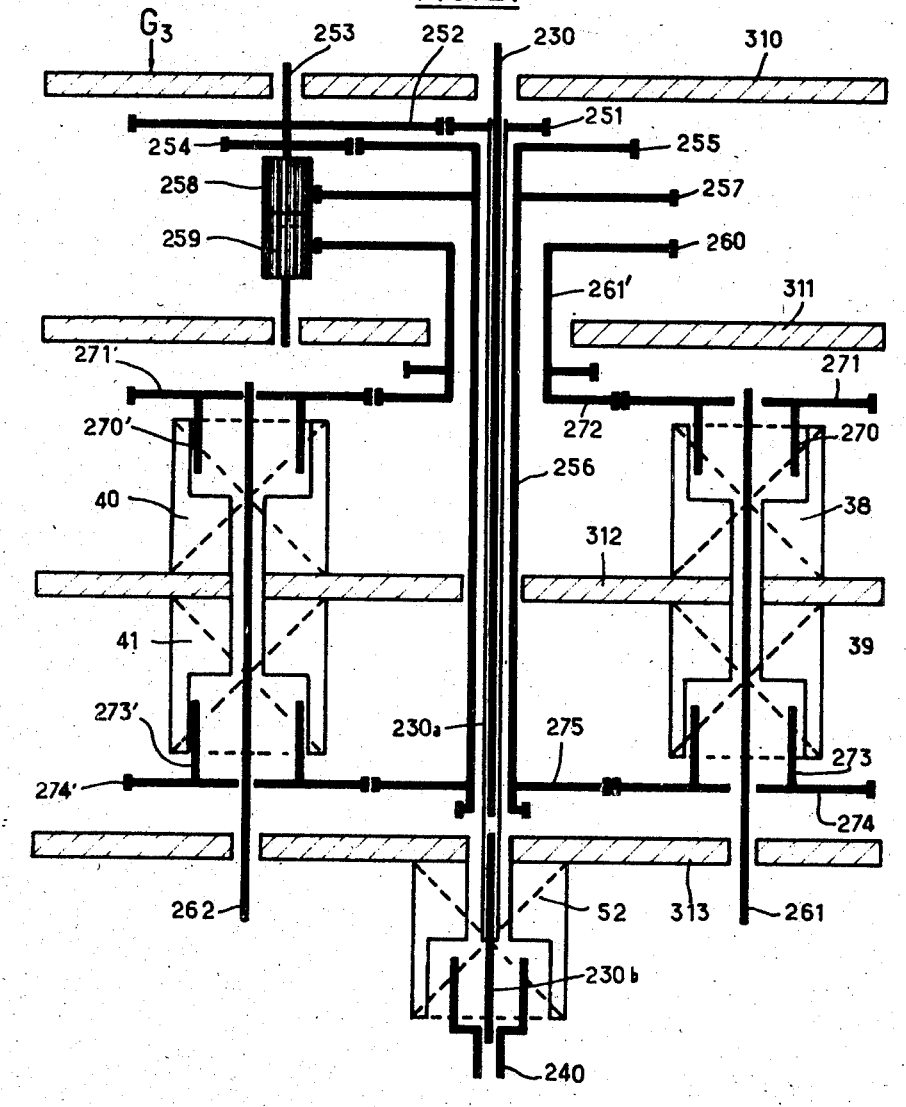

March 22, 1966 J. GRONIER 3,241,562
AUTOMATIC HAIR-CUTTING MACHINE HAVING PROGRAMMED CONTROL
MEANS FOR CUTTING HAIR IN A PREDETERMINED STYLE
Filed Feb. 10, 1961 21 Sheets-Sheet 15
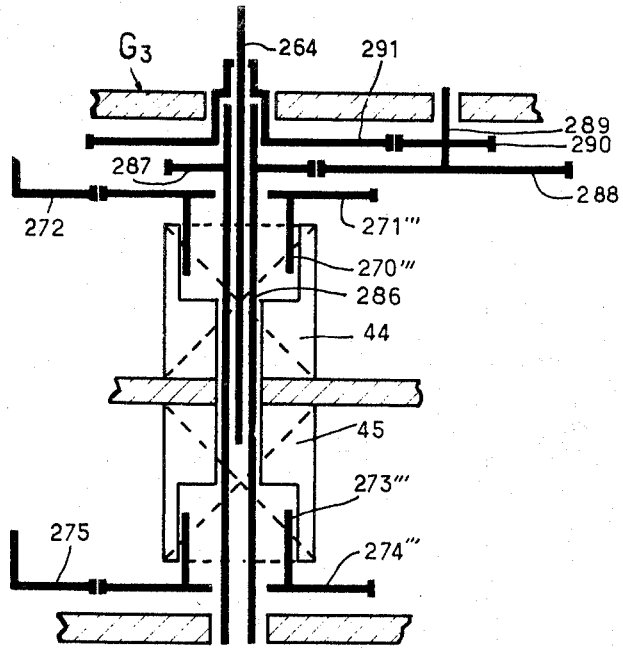
FIG: 22
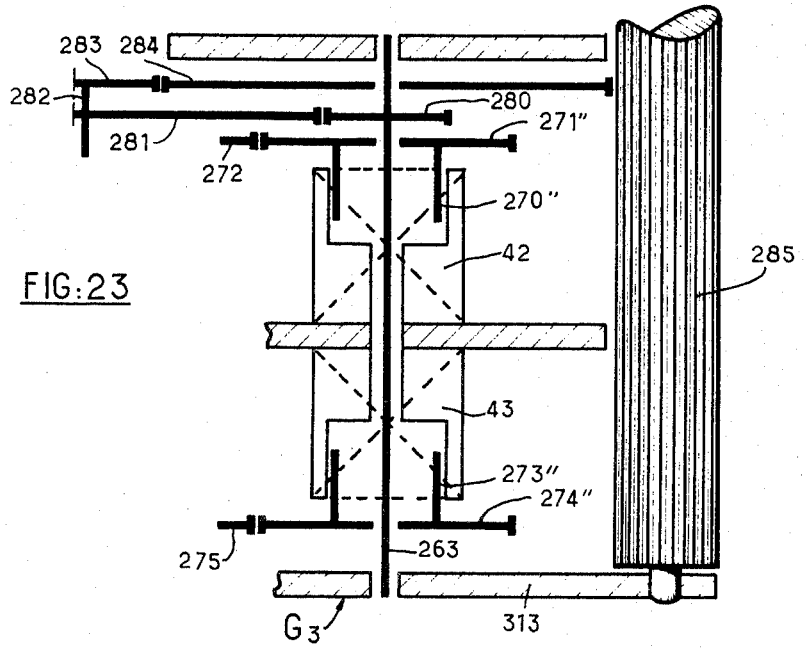
FIG: 23
INVENTOR
JEAN GRONIER
BY Irwin S. Thompson
ATTY.

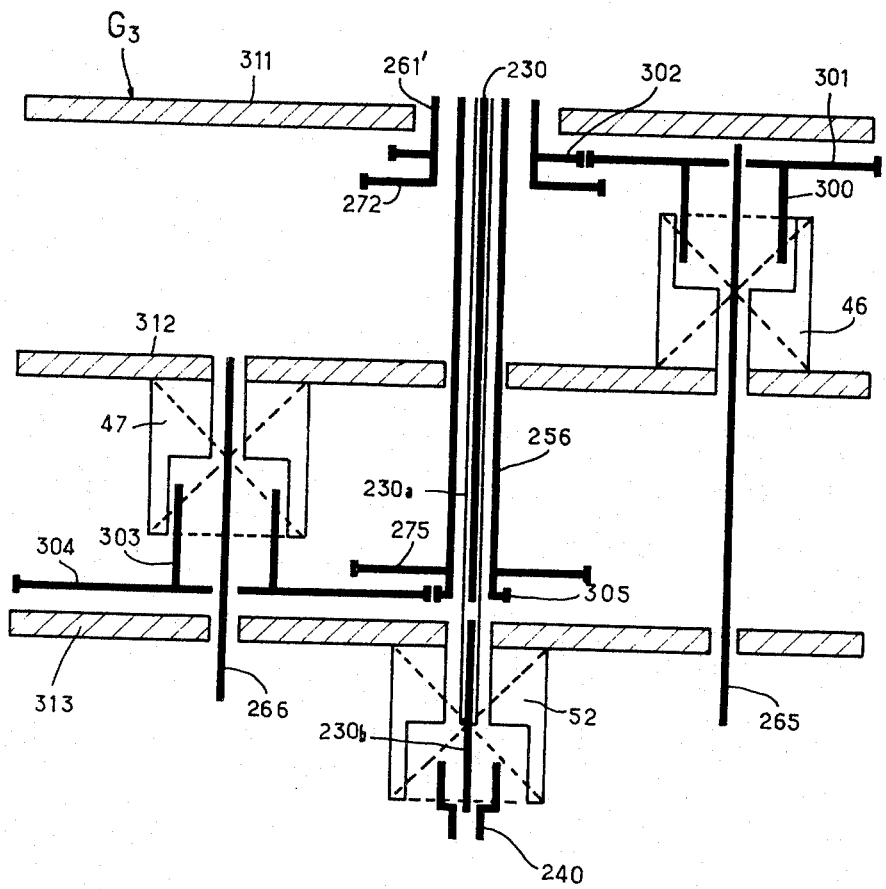
FIG: 24

March 22, 1966           J. GRONIER           3,241,562
AUTOMATIC HAIR-CUTTING MACHINE HAVING PROGRAMMED CONTROL
MEANS FOR CUTTING HAIR IN A PREDETERMINED STYLE
Filed Feb. 10, 1961           21 Sheets-Sheet 17
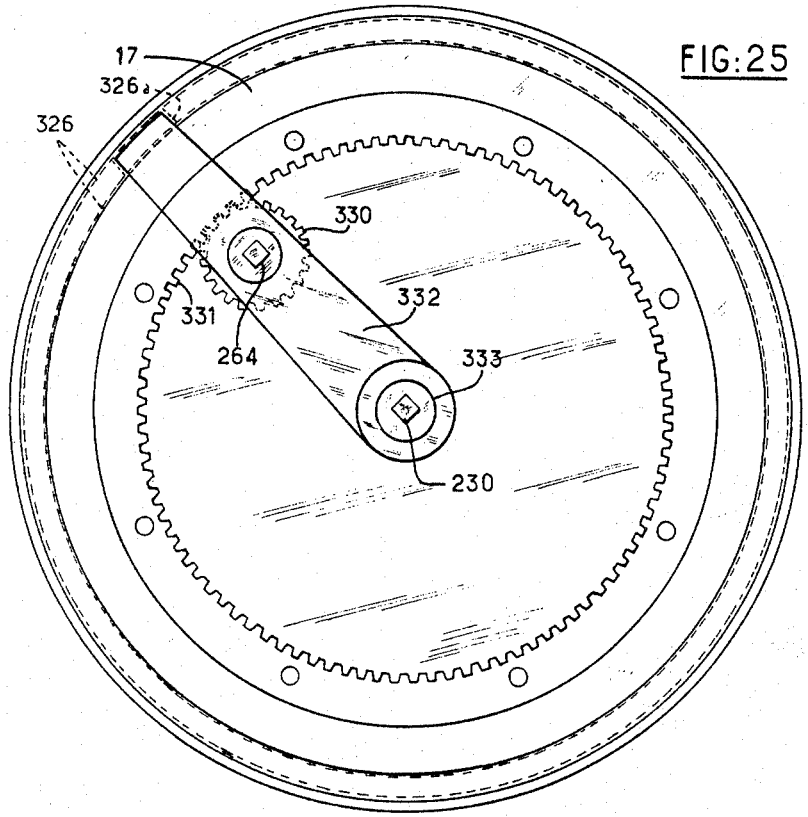
FIG: 25
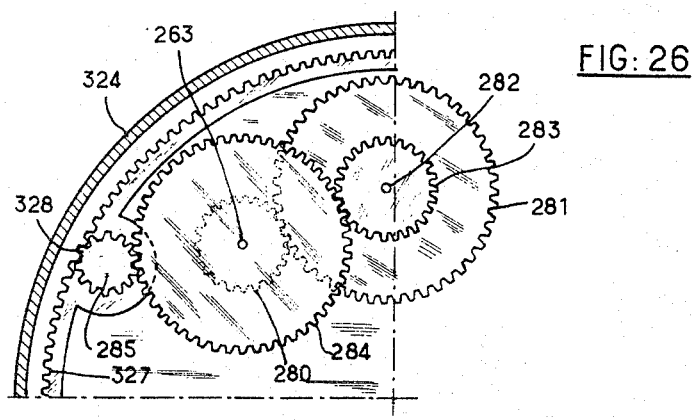
FIG: 26
INVENTOR
JEAN GRONIER
BY Irwin S. Thompson
ATTY.

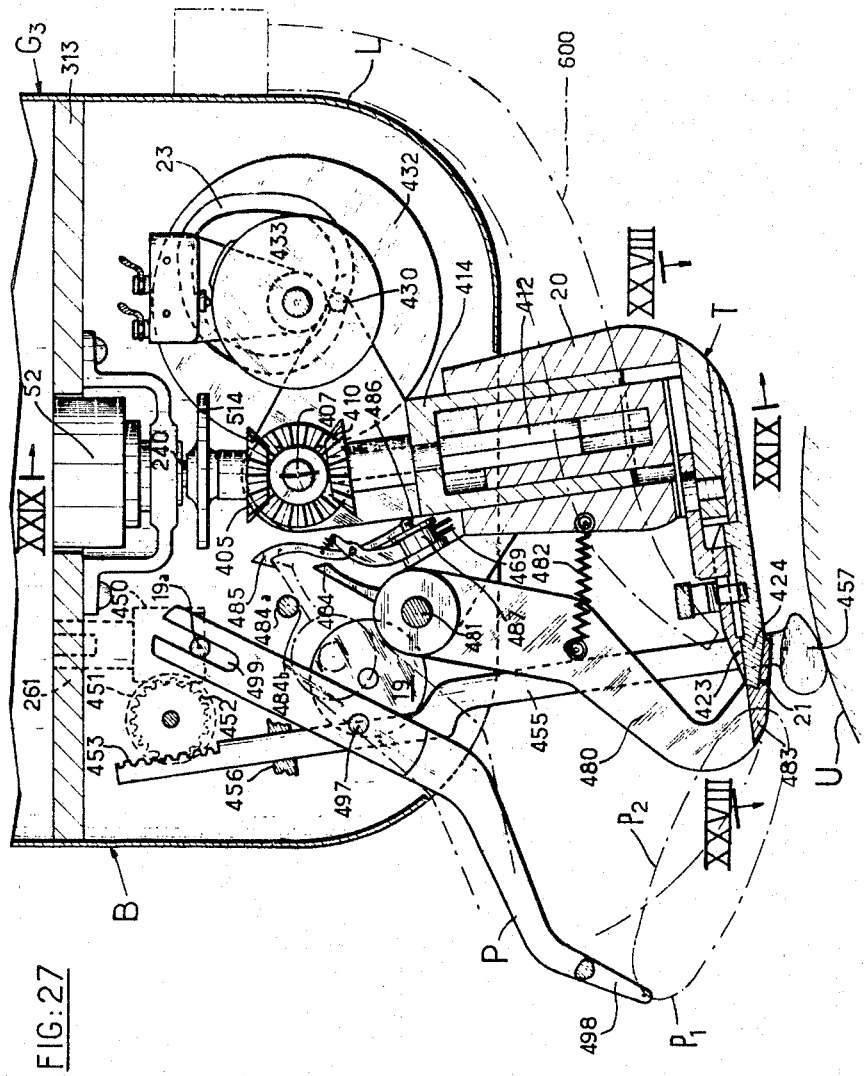

March 22, 1966 J. GRONIER 3,241,562
AUTOMATIC HAIR-CUTTING MACHINE HAVING PROGRAMMED CONTROL
MEANS FOR CUTTING HAIR IN A PREDETERMINED STYLE
Filed Feb. 10, 1961 21 Sheets-Sheet 19
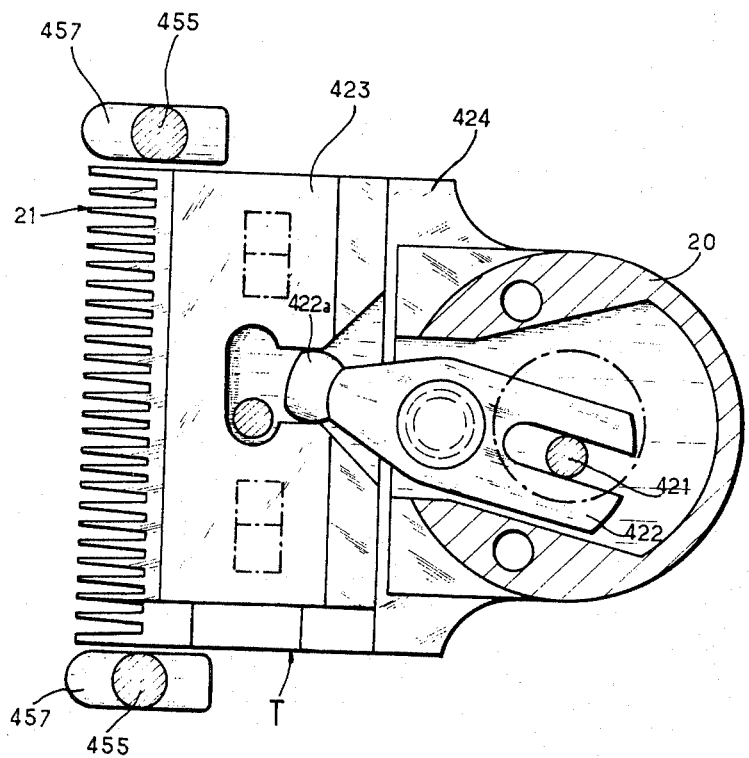
FIG:28
INVENTOR
JEAN GRONIER
BY Irwin S. Thompson
ATTY.

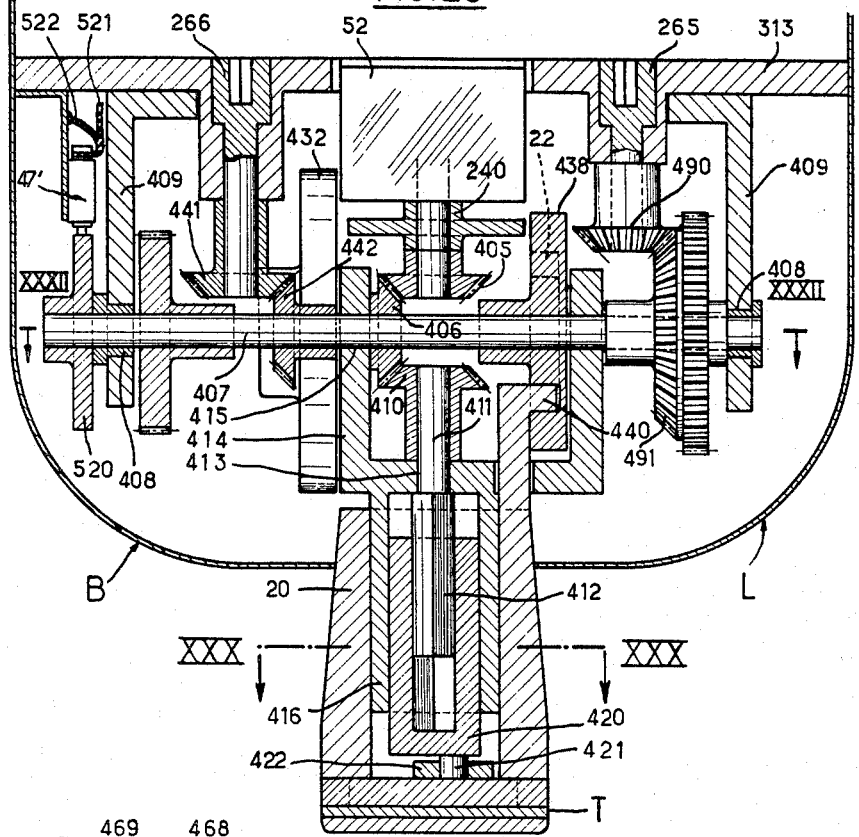
FIG:29
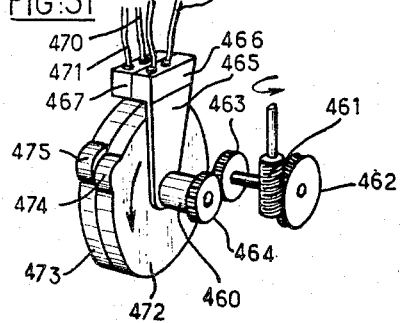
FIG:31
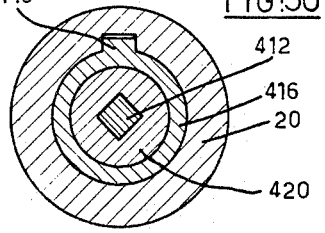
FIG:30

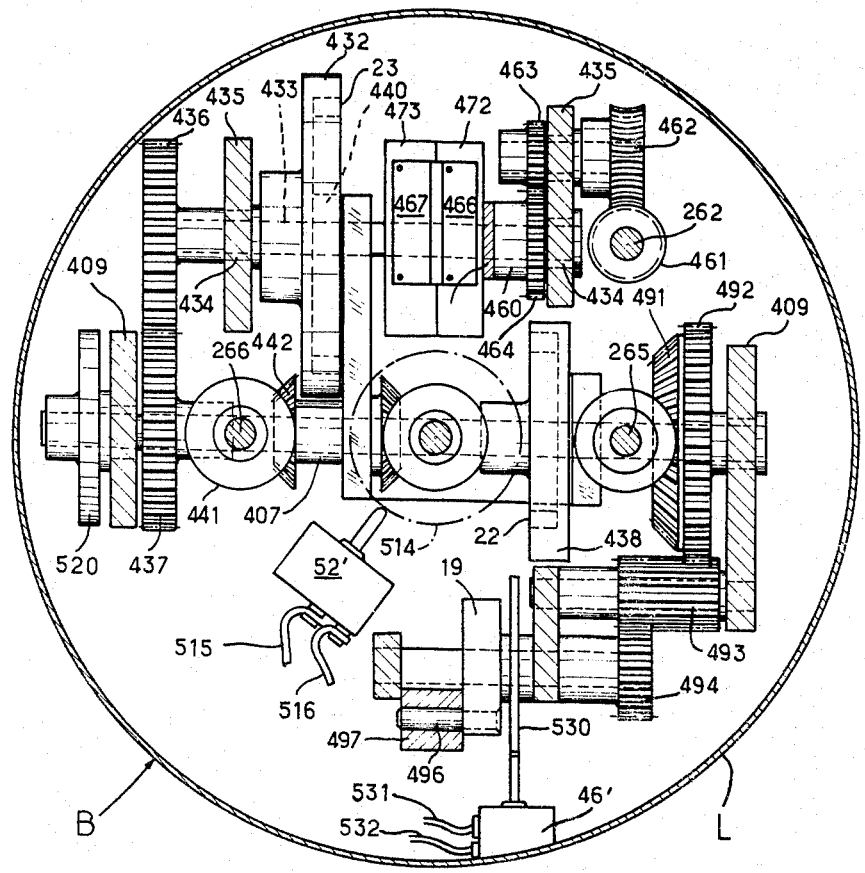
FIG: 32

United States Patent Office 3,241,562
Patented Mar. 22, 1966

3,241,562
AUTOMATIC HAIR-CUTTING MACHINE HAVING PROGRAMMED CONTROL MEANS FOR CUTTING HAIR IN A PREDETERMINED STYLE
Jean Gronier, 145 Blvd. de la Reine, Versailles, France
Filed Feb. 10, 1961, Ser. No. 88,409
Claims priority, application France, Feb. 16, 1960, 818,578; Feb. 1, 1961, 851,348
13 Claims. (Cl. 132—45)

My invention has for its object a hair-cutting machine comprising means for the automatic cutting of hair in accordance with a predetermined program; each program is designed for a particular person and is established once and for all with a view to obtaining repeatedly the same cut for the same head. More specifically, the machine includes a frame, implements for cutting the hair, movable means connecting the instruments with the frame, driving means for starting operation of said implements and of the connecting means and means controlling the movements of said implements and connecting means in accordance with a predetermined program.

A preferred embodiment of my invention is described hereinafter by way of example, reference being made to the accompanying drawings, wherein:

FIG. 1 is a lateral elevational view of a hair-cutting machine according to my invention.

FIG. 2 is a partial view of the machine in front elevational view, as seen in the direction of the arrows II—II of FIG. 1.

FIG. 3 is a diagrammatic view illustrating the modus operandi of the combing and cutting implements.

FIGS. 4 and 5 are diagrammatic views illustrating the means connecting the implement carrier with the frame of the machine.

FIG. 6 is a general wiring diagram of the means controlling the operation of the machine.

FIG. 7 is an elevational view showing the means controlling the pivotal motion of the outer arch of the implement-carrying means as seen in the direction of the arrows VII—VII of FIG. 8, part of the upper section of the frame being torn off.

FIG. 8 is a corresponding plan view as seen in the direction of the arrows VIII—VIII of FIG. 7, the cover of the upper section of the frame being removed.

FIG. 9 is a diagrammatic view of the first change speed gear incorporated with the apparatus.

FIG. 10 is a diagrammatic view of the second change speed gear.

FIG. 11 is an elevational view, partly torn off, of the connection between the inner arch or hoop and the outer arch or hoop of the implement-carrying means in its right-hand section.

FIG. 12 is a corresponding elevational view as seen in the direction of the arrows XII—XII of FIG. 11, certain parts being torn off.

FIG. 13 is a partial view of the inner arch in elevational view, as seen in the direction of the arrows XIII—XIII of FIG. 11.

FIG. 14 is a view similar to FIG. 11, showing the left-hand part of the arches.

FIG. 15 is a view, partly sectional, of the inner arch including the fourth and the fifth change speed gear as shown in elevational view in the direction of the arrows XV—XV of FIG. 14.

FIG. 16 is an elevational, partly sectional view of the upper part of the inner arch, together with the combing and cutting implements carried by said arch.

FIG. 17 is a view similar to FIG. 16, showing on a larger scale and with further detail the means carrying the third change speed gear.

FIG. 18 is a diagrammatic perspective view showing from above the arrangement of the different shafts of the third change speed gear.

FIG. 19 is a perspective view corresponding to FIG. 18 of the same parts as seen from underneath.

FIGS. 21, 22, 23 and 24 are diagrams showing the third change speed gear and, more particularly, the different shafts forming part of the latter.

FIG. 25 is a view from underneath of the upper part of the casing carrying the third change speed gear, as seen in the direction of the arrows XXV—XXV of FIG. 17.

FIG. 26 is a diagrammatic view of a section of the gear system controlling the movements of the implements towards or away from one another.

FIG. 27 is a longitudinal sectional view of the implement carrier.

FIG. 28 is a plan view, on a larger scale, of the clippers, as seen in the direction of the arrows XXVIII—XXVIII of FIG. 27.

FIG. 29 is a view of the implement carrier in sectional view through line XXIX—XXIX of FIG. 27.

FIG. 30 is a view of the handle carrying the clippers shown in cross-section through line XXX—XXX of FIG. 29.

FIG. 31 is a diagrammatic perspective view of a section of the means controlling the hair-cutting machine.

FIG. 32 is a view of the implement carrier shown in cross-section through line XXXII—XXXII of FIG. 29.

Figure 20:
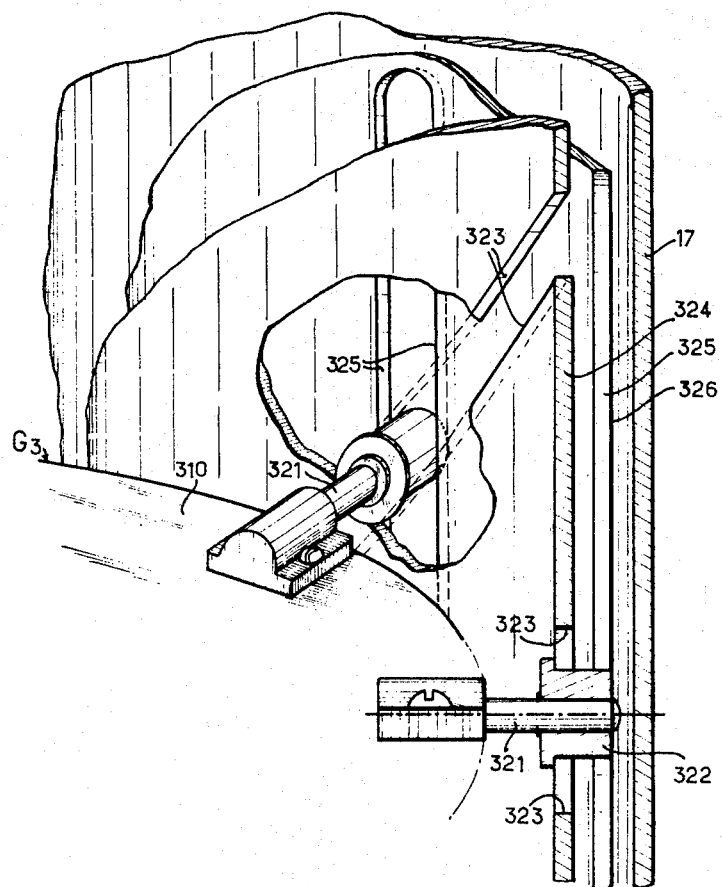
FIG. 20 is a perspective view, partly torn off, showing the connection between the third change speed gear and the casing carrying it.

In the embodiment illustrated, my improved hair-cutting machine includes chiefly, as shown in FIGS. 1 to 3, a stationary frame A, an implement carrier B carrying a combing implement P and clippers or the like cutting means T, together with a movable connecting system C adapted to be set in any desired angular direction and to connect the implement carrier B with the frame A, so that the implements P and T may operate by remaining at any desired point of the hair H of the person S, the hair of which is to be cut, or else, by moving along said hair H, while assuming any desired angular setting, said implements being shifted away when desired from the hair H, either for a period of rest, or else, for their passage from one point of the hair surface to another.

The connecting system C includes an external arch or hoop 11 revolvably carried by the support A around a vertical axis 12, an inner arch or hoop 13 revolvably carried on said external arch around a horizontal axis 14, a ring 15 revolvably carried by the inner arch 13 around an axis 16 perpendicular to the plane of said inner arch 13 and a casing 17 revolvably carried by said ring 15 around an axis 18 perpendicular to last-mentioned axis 16, while the implement carrier B is revolvably mounted on the casing 17 around the axis of said casing 17 and is furthermore adapted to slide in parallelism with said axis (FIG. 2).

The trimming comb P shown in FIG. 3 is fitted on the implement carrier B in a manner such that it may assume a combing movement with a forward stroke $p1$ (FIG. 27) during which it acts as a rake on the hair, for instance in a front to rear movement and a return stroke $p2$ during which it passes over and above the hair without disturbing the trim ensured during the forward stroke. Said movement of the comb is obtained, as shown in FIG. 3, by means of an eccentric member 19 and a guide engaging a stationary spindle 19a. The trimming comb P may also be held fast in an upper stationary position away from the hair H, as illustrated in FIG. 3; this being obtained, for instance, in a permanent manner in the case of hair cut short in a stubble and brushed straight up from the forehead, in which case the comb is of no use, or else, in a transient manner during the cutting of hair when required and in the periods other than those during which the comb is to be actually shifted.

The clippers T (FIG. 3) are provided with a handle 20 and with shearing teeth 21. Said teeth are, either at a standstill so as to play the part of a comb raising the hair, or else, they are operative and serve for cutting the hair.

The handle 20 of the clippers (FIG. 3) is fitted by the implement carrier B in a manner such that it may be shifted with a view to executing a forward travel between a lower position illustrated in solid lines and an upper position illustrated in dot-and-dash lines, so that the teeth 21 may describe a curve $f$ and raise a hair or a lock of hair from H1 towards H2, said forward travel being followed by a return travel towards the lower position illustrated in solid lines. During the movement of the handle 20, the teeth 21 are generally at a standstill and act merely after the manner of a comb against the hair and they are started operating for cutting purposes only during a brief predetermined lapse of time starting from the point illustrated at K on curve $f$. As apparent from inspection of FIG. 3, the curve $f$ shows at the start a loop $f1$ for engaging the hair H1, said loop being followed by a section $f2$ providing for the raising of the hair. Preferably, the teeth 21 remain tangent, during their movement, to a geometrical sphere V which is assumed to surround the scalp of the patient, which is considered as identical with a spherical ball U. The movements of the handle 20 are controlled by a pair of cams 22 and 23, of which the former controls the telescopic expansion of the handle 20, while the second cam controls the angular position of said handle. The handle 20 of the clippers T may also be held fast in its lower position illustrated in solid lines in FIG. 3, for instance permanently in the case of the cutting of hair cut short and brushed straight up from the forehead, in which case the clippers T pass over the scalp and allow the teeth 21 to operate during a long period, or else, in a transient manner in the case of hair cutting during which the handle 20 is to be shifted and during the periods other than those during which the clippers T are to operate.

The position of the implement carrier B is defined at each moment by a number of parameters which I will term $a, b, c', c, d, e, t$ and $k$.

The parameter $a$ is the angular setting of the outer hoop 11 with reference to the frame or support A around the axis 12 (FIG. 4).

The parameter $b$ is the slope of the inner hoop 13 with reference to the outer hoop 11 around the axis 14 (FIG. 4).

The parameter $c'$ is the angle formed with the axis X of the hoop 13, of the projection Z of the axis of the casing 17 on the plane Y of the hoop 13 (FIG. 4).

The parameter $c$ is the angle formed by the axis of the casing 17 with its projection Z on the plane Y (FIG. 4).

The parameter $d$ is the angular position of the implement carrier B around the axis of the casing 17 (FIG. 4).

The parameter $e$ is the distance between the two above-defined spheres H and U (FIGS. 3 and 5).

The parameter $t$ defines the position of the implement carrier B along the axis of the casing 17 (FIG. 5).

The parameter $k$ defines the point of the curve $f$ at which the teeth 21 of the clippers T are started for cutting the hair (FIG. 3).

My improved machine includes control means adapted, on the one hand, to provide for the constancy or modification of the parameters $a, b, c', c, d, e, t, k$ and, on the other hand, to produce selectively the shifting of the implements P and T with reference to their carrier B and also the starting of the shearing teeth 21 of the clippers T and of the like parts to be described hereinafter.

The control means according to my invention are shown in FIG. 6 and they include a supply of electric current 24, an electric motor M fed by the supply 24 through two switches 64a and 66a, program-defining means R fed by the supply 24 through a switch 67a, a rectifier 25 and a lead 26, stations G1, G2, G3, G4, G5 for setting the implement carrier B in the desired position, which stations are fed selectively by the program-defining means R, a lead 510 through which the parts are maintained in the desired condition and connected at 27 with a lead 26 and, lastly, a station L making the implements P and T operate, which station is fed by the program-defining means R and the lead 510.

The electric motor M (FIGS. 1 and 6) is adapted to transmit movement to the different movable parts of the machine. The program-defining means R is of a structure well-known per se and include, as shown in FIG. 6, a strip 28 provided with perforations 29 and driven by a cylinder 54. The latter is started by the motor M through the agency of the gearing 55 (FIG. 1). The perforations 29 of the strip 28 cooperate with twenty-three miniature switches 56 which are inserted between the lead 26 and corresponding twenty-three electrically controlled clutches incorporated with the various stations G1, G2, G3, G4, G5 and L. Said electrically controlled clutches are of a type well-known per se.

The station G1 (FIG. 6) carries the first change speed gear defining the value of the parameter $a$ and containing four electrically controlled clutches 30, 31, 32 and 33 forming part of the twenty-three clutches mentioned hereinabove. The station G2 carries a second change speed gear defining the value of the parameter $b$ and contains four further electrically controlled clutches 34, 35, 36 and 37. The station G3 carries a third change speed gear defining the parameters $d, e, t, k$ and ensuring the control of the trimming comb P and of the cams 22 and 23, said station G3 containing ten further electrically controlled clutches 38, 39, 40, 41, 42, 43, 44, 46 and 47. More specifically, the clutches 38 and 39 define the parameter $d$, the clutches 40 and 41 the parameter $e$, the clutches 42 and 43 the parameter $k$, the clutches 44 and 45 the parameter $t$, while the clutch 46 controls the eccentric member 19 actuating the trimming comb P and the clutch 47 controls the movement of the cams 22 and 23 cooperating with the handle 20 of the clippers T. The station G4 carries a fourth change speed gear defining the value of the parameter $c$ and containing two further clutches 48 and 49. The station G5 carries a fifth change speed gear defining the value of the parameter $c'$ and contains two further clutches 50 and 51. As to the last electrically controlled clutch 52, it forms part of the station L and controls the operation of the shearing teeth of the clippers T. The station L is incorporated with the implement carrier B.

The electrically controlled clutches 46 and 47 of the station G3 and the electrically controlled clutch 52 of the station L (FIG. 6) may be fed not only through the miniature switches corresponding thereto and shown at 56 in the program-defining means R, but also by the energization-maintaining lead 510 under the control of the miniature switches 46', 47' and 52'. The miniature switch 46' has one terminal connected through a lead 531 with said lead 510 and its other terminal connected through a lead 532 with a point ahead of the electrically controlled clutch 46. The miniature switch 47' has one terminal connected through a lead 521 with the lead 510 and another terminal connected by a lead 522 with a point ahead of the electrically controlled clutch 47. The miniature switch 52' has one terminal connected through a lead 515 with the lead 510, while its other terminal is connected through a lead 516 to a point ahead of the electrically controlled clutch 52. Furthermore, there is connected with the lead 522 at 522a a lead 468 connected with a terminal of the miniature switch 466, of which the other terminal is connected with a lead 469 feeding the electromagnet 487. To the lead 468 is connected in its turn, at 468a, a lead 470 connected with a terminal of a miniature switch 467, of which the other terminal is connected through a lead 471 with a point 516a on the lead 516. The part played by the miniature switches 46', 47', 52', 466 and 467 and the electromagnet 487 and the further parts of the wiring diagram shown in FIG. 6, will be disclosed hereinafter.

The frame A of the machine includes, as shown in FIG. 1, an upright 60 carrying a bracket 61 to which is revolvably suspended the external hoop 11 and which is provided with a cover 61a. A shoe 62 carries the arm chair 63 in which the patient S is seated, while a pedal 64 is adapted to stop the operation of the machine if the patient so wishes. Said pedal 64 controls the switch 64a (FIG. 6) through a system of a type known per se. It is further apparent from inspection of FIG. 1, that a pedal 65 allows raising or lowering the armchair 63, so as to adjust the height of the head of the patient S with reference to the implements P and T. The mechanism connecting the pedal 65 with the armchair 63 may be of any desired type, for instance a hydraulic type, while its structure is the same as that used for the armchairs of dentists and barbers.

Furthermore, the upright 60 (FIG. 1) carries a knob 66 which is operable by hand and controls the switch 66a (FIG. 6) while another knob 67 controls the switch 67a. The upright 60 carries at its upper end the motor M which drives, through a chain transmission 70, a vertical shaft 71 (FIGS. 1 and 7). To the shaft 71 is keyed a gearwheel 55 which drives the program-defining means R; the latter is secured to the upper end of the upright 60 adjacent the motor M. The shaft 71 (FIG. 7) is connected through a cardan joint or the like 72 with the input shaft 73 of the first change speed gear G1, which latter includes two output shafts 74 and 75 (FIGS. 7 and 8). The input shaft 73 is driven by the motor M at a speed of about 1,000 r.p.m. The output shaft 74 is adapted to define the parameter $a$ while the other output shaft 75 provides for the transmission of movement towards the following sections of the machine.

The first change speed gear G1 includes, as shown in FIG. 9, a pinion 76 rigid with the input shaft 73 and meshing with two pinions 77 and 78. The pinion 77 is rigid with a drum 79 carried by one of the components of the electrically controlled clutch 30, of which the other component is shown at 80.

The shaft 80 carries a pinion 81 which meshes with a pinion 82, which latter is coaxially rigid with a pinion 83 meshing with a further pinion 84 rigid coaxially with the output shaft 74.

The shaft 80 carries also one of the components of the electrically controlled clutch 31, of which the cooperating drum component is shown at 85. The drum 85 is rigid with a pinion 86 coaxial therewith and meshing with a pinion 87. The latter is coaxially rigid with a shaft 88 carrying the pinion 78. Said pinion 87 meshes with a pinion 89 rigid with the other output shaft 75 of the change speed gear G1.

The shaft 80 forms, furthermore, one of the components of the electrically controlled clutch 32, of which the other component is constituted by a drum 90 rigid with a pinion 91. The latter meshes with a pinion 92 which, in its turn, meshes with a pinion 93 rigid with the shaft 88.

The shaft 80 is provided furthermore at its outer end with a pinion 94 meshing with a pinion 95, which latter meshes in its turn with a pinion 96 rigid with a drum 97. The latter carries one of the components of the electrically controlled clutch 33, of which the other component is constituted by the shaft 88.

Assuming the four electrically controlled clutches 30, 31, 32 and 33 are deenergized, the output shaft 74 defining the parameter $a$ remains stationary. If the electrically controlled clutch 30 is energized while the three other clutches are deenergized, the shaft 74 revolves forwardly at a high speed, say about 124 r.p.m. If the clutch 31 is energized, and the three other clutches are deenergized, the shaft 74 revolves forwardly at a speed of about 30 r.p.m. If the clutch 32 is energized, the three other clutches being deenergized, the shaft 74 revolves rearwardly at a low speed, say 30 r.p.m. If the clutch 33 is energized, the three other clutches being deenergized, the shaft 74 is driven rearwardly at a high speed, say about 124 r.p.m.

In contradistinction, whatever may be the condition of the clutches 30, 31, 32 and 33, the other output shaft 75 is driven permanently by the pinions 76, 78 and 87. The shaft 75 revolves substantially at the same speed as the input shaft 73, say 1,000 r.p.m.

The shaft 74 is connected, as shown in FIGS. 7 and 8, through a cardan joint 100 with a shaft 101 extending inside the bracket 61. Said shaft 101 is connected through a further cardan joint 102 with a shaft 103, which latter is carried by a bearing 104 and is rigid with a worm 105 meshing with a worm wheel 106. The latter is rigid with the pivotal shaft 12 carrying the outer hoop 11.

The other output shaft 75 of the first change speed gear G1 is connected, as shown in FIGS. 7 and 8, through a cardan joint 107 with a shaft 108 extending also inside the bracket 61. The shaft 108 is connected through a cardan joint 109 with a shaft 110 carried by a bearing 111. The shaft 110 is rigid with a worm 112 meshing with a worm wheel 113, which latter is rigid with a shaft 114 extending inside the above-mentioned shaft 12 which is hollow, in order to carry said shaft 114.

The shaft 12 is mounted inside bearings 115 inside the bracket 61 and carries the outer loop 11. The shaft 114 forms the input shaft for the second change speed gear G2, of which the output shafts are illustrated at 127 and 130 (FIG. 10). The shaft 127 is intended for the definition of the parameter $b$, while the shaft 130 serves for transmitting movement towards the following sections of the machine. The second change speed gear G2 is housed at the upper end of the loop or arch 11 and will now be described.

Said second change speed gear G2 includes a series of pinions (FIG. 10) similar to that forming the first change speed gear G1. The input shaft 114 carries the pinion 116 meshing with two pinions 117 and 118. The pinion 117 is rigid with a shaft 119 forming one component of the electrically controlled clutch 34. The other component of said electrically controlled clutch 34 is constituted by a drum 120 rigid with a pinion 121, which latter meshes with a pinion 122. Said pinion 122 meshes with a pinion 123 rigid with shaft 124. The latter carries a worm 125 meshing with a worm wheel 126 rigid with one of the output shafts 127 of the change speed gear G2.

The shaft 119 is rigid with a pinion 128 meshing with a pinion 129, which latter is rigid with the other output shaft 130 of the change speed gear.

The shaft 119 is also rigid with a pinion 131 meshing with a pinion 132 meshing in its turn with a pinion 133. The pinion 133 is rigid with a drum 134 forming one of the components of the electrically controlled clutch 35, the other component of which is constituted by the shaft 124.

The shaft 119 is rigid with the pinion 135 meshing with a pinion 136. The latter is rigid with a drum 137 forming one of the shafts of the clutch 36, of which the other component is constituted by the shaft 124. The latter forms, furthermore, one of the components of the electrically controlled clutch 37, the other component of which is constituted by a drum 138 coaxially rigid with the pinion 118.

The input shaft 114 which receives its movement from the shaft 75 revolving at about 1,000 r.p.m. through the agency of the gears 112 and 113, also rotates at about 1,000 r.p.m.

When the four clutches 34, 35, 36 and 37 are deenergized, the first output shaft 127 defining the parameter $b$ is stationary. When the clutch 34 is energized and the three other clutches are deenergized, the shaft 127 revolves rearwardly at 125 r.p.m. When the clutch 35 is energized and the other three clutches are deenergized, the shaft 127 revolves rearwardly at 31 r.p.m. When the clutch 36 is energized and the three other clutches are deenergized, the shaft 127 revolves forwardly at 31 r.p.m. When the clutch 37 is energized and the three other clutches are deenergized, the shaft 127 revolves forwardly at 125 r.p.m.

In contradistinction, whatever may be the energized or deenergized condition of the electrically controlled clutches 34, 35, 36 and 37, the other output shaft 130 revolves permanently at the speed of about 1,000 r.p.m.

The shaft 127 extends inside the left-hand arm of the loop 11 (FIG. 11) and is connected through a cardan joint 140 with a stubshaft 141 carried by a bearing 142 inside said arm.

The shaft 141 is connected through a cardan joint 143 with a shaft 144 carrying at its lower end a pinion 145 (FIG. 12). The latter meshes with a pinion 146 carrying a shaft 147 coaxial with the axis 14 and rigid with the inner loop 13. A compensating system forming a counterweight for the loop 13 is provided inside the loop 11 and includes a spring 150 attached at 151 to the loop 11 and secured at its other end to a cable 152 wound around a pulley 153 rigid with the shaft 147. When the shafts 127 and 144 are stationary, the loop 13 retains its position with reference to the loop 11 and the parameter $b$ remains constant. When the shaft 144 revolves in either direction, the loop 13 is shifted in a corresponding direction around the axis 14, the parameter $b$ varying correspondingly. It is apparent from inspection of FIG. 13 that an arcuate port 148 is provided at the lower end of the loop 13 in order to guide accurately the electric cable 149 (FIGS. 6 and 11) between the change speed gears G2 and G3, whatever may be the angular position of the loop 13. The other shaft 130 of the second change speed gear G2 (FIG. 14) extends inside the right-hand arm of the outer loop 11. It is connected through a cardan joint 160 with a stubshaft 161 carried by a bearing 162. The stubshaft 161 is connected through a cardan joint 163 with a shaft 164 extending downwardly towards the lower end of the arm 11 and carrying at its end a pinion 165. The latter meshes with a pinion 166 rigid with a shaft 167 mounted loose between the two loops 11 and 13, coaxially with the pivotal axis between the latter and carrying a pinion 168 identical with the pinion 166 and housed inside the inner loop 13. The pinion 168 meshes with a pinion 169 similar to the pinion 165 (FIGS. 14 and 15). The pinion 169 is rigid with a shaft 170 connected through a cardan joint 171 with a shaft 172 rising inside the loop 13.

The shaft 172 is connected with a flexible cable 200 which rises inside the inner loop 13 and passes out of the latter at its upper end (FIGS. 14 to 16), so as to be connected with a control shaft 201 for the third change speed gear G3.

The shaft 172 carries furthermore a pinion 173 connected through a chain 174 with a pinion 175. The latter forms the input shaft for the fourth change speed gear G4 defining the parameter $c$; the pinion 175 is rigid with a bevel pinion 176 meshing with a further bevel pinion 177 meshing in its turn with a bevel pinion 178. The pinion 176 forms one of the components of the clutch 48, of which the other component is the shaft 180. The pinion 178 is rigid with one of the components of the clutch 49, of which the other component is constituted by the shaft 180. The shaft 180 forms the output shaft for the change speed gear G4.

When the two clutches 48 and 49 in the change speed gear G4 are deenergized, the shaft 180 remains stationary. When the clutch 48 is energized and the clutch 49 is deenergized, the output shaft 180 revolves forwardly. In contradistinction, when the clutch 49 is energized and the clutch 48 is deenergized, the shaft 180 revolves rearwardly.

The shaft 172 carries also a pinion 183 connected through a chain transmission 184 with a pinion 185, which latter forms the input shaft for the fifth change speed gear G5 defining the parameter $c'$. The pinion 185 is rigid with a bevel pinion 186, which latter meshes with a pinion 187 meshing in its turn with a bevel pinion 188. The pinion 186 forms one of the components of the clutch 50, of which the other component is the shaft 190. The pinion 188 is rigid with one of the components of the clutch 51, of which the other component is constituted by the shaft 190. The latter forms the output shaft for the change speed gear G5.

When the two clutches 50 and 51 are deenergized the output shaft 190 of the change speed gear G5 remains stationary. When the clutch 50 is energized and the clutch 51 is deenergized, the shaft 190 revolves forwardly, while, if the clutch 50 is deenergized and the clutch 51 is energized, the shaft 190 revolves rearwardly.

The shafts 180 and 190 are connected with corresponding flexible cables 191 and 192 entering through openings 193 inside the loop 13 and rising inside the latter, so as to pass out of it at its upper end, whereby they may be connected respectively with a shaft 194 defining the parameter $c$ and with a shaft 195 defining the parameter $c'$.

The shaft 195 defining the parameter $c'$ is revolvably carried, as shown in FIG. 16, in a casing 218 rigid with the loop 13. The shaft 195 transmits its movement through a gearing forming a high speed reducer 219 to one of the two spindles 213 through which the ring 15 is pivotally carried by the loop 13 around the axis 16. When the shaft 195 is allowed to revolve at 1,000 r.p.m. forwardly or rearwardly, under the action of the change speed gear G5, the ring 15 revolves at the rate of one r.p.m. with reference to the loop 13 in either direction around the axis 16, whereby the parameter $c'$ is modified as required.

The shaft 194 defining the parameter $c$, is revolvably carried, as illustrated in FIGS. 16 and 17, inside a casing 220 rigid with the ring 15. Said shaft 194 transmits its movement through the gearing providing a considerable reduction in gear 221, to one of the two spindles 216 through which the casing 17 is pivotally carried on the ring 15 around the axis 18. When the shaft 194 is caused to revolve at 1,000 r.p.m. forwardly or rearwardly under the control of the change speed gear G4, the casing 17 revolves by one r.p.m. around the ring 15 in either direction around the axis 18, whereby the parameter $c$ is adjusted.

The third change speed gear G3 includes a frame constituted by four superposed plates 310, 311, 312 and 313 interconnected by uprights 314 (FIGS. 17 to 19), said frame being inserted inside an inner casing 320 and being rigid with the implement carrier B. The system 310, 311, 312, 313, 314, is suspended inside the main casing 17, as shown in FIGS. 17 and 20, by means of a plurality of radial spindles 321. Each spindle 321 is provided with a roller 322 engaged, on the one hand, by a helical slope 323 formed in a drum 324 and, on the other hand, by a rectilinear slope 325 parallel with the axis of the drum 326 in which it is formed, said drum being arranged coaxially with the drum 324 and the two drums carried inside the casing 17 being revolvable therein around the axis of the latter, while they are held against axial shifting.

The change speed gear G3 includes, as shown in FIG. 17, an input shaft 230 coaxial with the axis of the casing 17 and driven into rotation by the above-mentioned shaft 201, as will be disclosed hereinafter. The shaft 201 is revolvably carried in the casing 220 and is rigid with a pinion 231, which latter meshes with a pinion 232 mounted loose around the above-mentioned spindle 216. Said pinion 232 is coaxially rigid with a bevel pinion 233. The pinion 233 meshes with a pinion 234 which is rigid with the input shaft 230 and is revolvably carried in an axial bore 234a, in the casing 17. The ratio of the gearing 231, 232, 233, 234 is such that when the shaft 201 revolves at 1,000 r.p.m., the shaft 230 revolves at 600 r.p.m.

The shaft 230 (FIGS. 18 and 21) may be urged to a variable extent into the change speed gear G3 and carries along with it the sleeve 230a and therethrough the shaft 230b forming a component of the clutch 52, of which the other component is the shaft illustrated at 240. Said shaft 240 controls the shearing movement of the clippers T, as will be shown hereinafter.

The sleeve 230a carries, as shown in FIG. 21, a pinion 251 meshing with a pinion 252 rigid with a shaft 253 also carrying a pinion 254. The latter meshes with a pinion 255 rigid with a sleeve 256 surrounding freely the sleeve 230a and revolving at 60 r.p.m. under the action of the gearing 251, 252, 253 and 255. To allow a movement at the same speed of 60 r.p.m. in the opposite direction, the sleeve 256 carries a pinion 257 meshing with a pinion 258 carried loosely by its spindle. The pinion 258 meshes with a pinion 259 also loose on its spindle and meshing with a pinion 260. The spindles carrying the pinions 258 and 259 which are illustrated in FIG. 21, as in one with the shaft 253, are in practice spaced with reference to each other. The pinion 260 is rigid with a sleeve 261' revolving at the same speed as the sleeve 256, but in the opposite direction.

The sleeves 256 and 261' control altogether six shafts, to wit: 261, 262, 263, 264, 265 and 266 which are associated with the shaft 240 to form, as shown in FIGS. 18 and 19, the seven output shafts of the change speed gear G3.

The shaft 261 (FIG. 21) defines the parameter $e$ and forms one of the components of each of the clutches 38 and 39. The other component of the clutch 38 is formed by a drum 270 rigid with a pinion 271 which meshes with a pinion 272 rigid with the sleeve 261'. The other component of the clutch 39 is constituted by a drum 273 rigid with a pinion 274 meshing with a pinion 275 rigid with the sleeve 256. When the two clutches 38 and 39 are deenergized, the shaft 261 is stationary. When the clutch 38 is energized and the clutch 39 is deenergized, the shaft 261 revolves forwardly at a speed of 60 r.p.m. when the clutch 38 is deenergized and the clutch 39 is energized, the shaft 261 revolves rearwardly at 60 r.p.m.

The shaft 262 defines the parameter $k$. It forms similarly (FIG. 21) one of the components of the two clutches 40 and 41 and is controlled by the pinions 272 and 275 through the parts 270', 271', 273' and 274' similar to the elements 270, 271, 273 and 274. When the two clutches 40 and 41 are deenergized, the shaft 262 is stationary. When the clutch 40 is energized and the clutch 41 is deenergized, the shaft 262 revolves forwardly at 60 r.p.m. For the reverse condition, the shaft 262 revolves rearwardly at 60 r.p.m.

The shaft 263 defines the parameter $t$. It forms (FIG. 23), one of the components of the clutches 42 and 43. It is controlled by the pinions 272, 275 through the parts 270'', 271'', and 273'' and 274''. According to the condition of said clutches 42 and 43 and similarly with the preceding disclosure, the shaft 263 is either stationary, or revolves in either direction at 60 r.p.m. The shaft 263 carries, as shown in FIGS. 23 and 26, a pinion 280 which meshes with a pinion 281 rigid with a shaft 282. The latter carries a pinion 283 meshing with a pinion 284, which latter meshes in its turn with an elongated pinion 285 revolvably carried in the plates 310 and 313. The elongated pinion 285 revolving at a speed of 6.66 r.p.m., meshes in its turn at 328 with an inwardly toothed wheel 327 formed on the inner drum 324 (FIGS. 17 and 26). When the shaft 263 and the pinion 285 are stationary, the drums 324 and 326 are also stationary and the change speed gear G3 retains the same level with reference to the casing 17, the parameter $t$ remaining constant. When the shaft 263 and the pinion 285 revolve in either direction, the change speed gear G3 rises or sinks with reference to the casing 17 under the action of the gear 328 and of the helical slopes 323, the parameter $t$ varying in either direction. It will be remarked that the second drum 326 provided with rectilinear slopes 325 constrains the parameter $d$ to remain constant during the modifications of $t$.

The shaft 264 defines the parameter $d$. It is controlled (FIG. 22) starting from the pinions 272 and 275 through the parts 270''', 271''', 273''' and 274''' similar to the parts 270, 271, 273 and 274 associated with the shaft 261. The drum 270''' forms one of the components of the clutch 44, the other component of which is not constituted by the shaft 264, but by a shaft 286 coaxial with the latter. The shaft 286 and the drum 273''' form the two components of the clutch 45. The shaft 286 carries a pinion 287 meshing with a pinion 288 rigid with a shaft 289. The latter carries a pinion 290 which meshes with a pinion 291 revolving in unison with the shaft 264, while allowing the shaft 264 to slide inside the tubular shaft 286. The series of pinions 287, 288, 290 and 291 introduces a reduction of the speed by one ninth. When the clutches 44 and 45 are deenergized, the shaft 264 is stationary. When the clutch 44 is energized, and the clutch 45 is deenergized, the shaft 264 revolves at a forward speed of 6.66 r.p.m. When the clutch 44 is deenergized and the clutch 45 is energized, the shaft 264 revolves rearwardly at 6.66 r.p.m. The shaft 264 (FIGS. 17 and 25) extends upwardly with reference to the change speed gear G3 and carries a pinion 330 which meshes with an annular rack 331 secured to the lower surface of the upper cover of the casing 17. The pinion 330 is carried by an arm 332 which is carried at its inner end 333 on the casing 17, so as to revolve around the axis of the latter, while its other outer end drives the drum 326 through a projection 326a provided at its said outer end. When the shaft 264 is stationary, the system G3–B remains stationary as to its angular setting with reference to the casing 17 around the axis of the latter, the parameter $d$ remaining constant. When the shaft 264 revolves in either direction, the pinion 310 moves over the rack 331, which produces a relative rotary movement between the arms 332 and the rack 331. Consequently, the system G3–B driven by 330, 326a, 326 and 324 is allowed to rotate in either direction with reference to the casing 17 around the axis of the latter, whereby the parameter $d$ is caused to vary in either direction.

The shaft 265 drives the eccentric member 19 controlling the trimming comb P (FIG. 3). It forms (FIG. 24) one of the components of the clutch 46, the other component of which is constituted by a drum 300 rigid with a pinion 301. The latter meshes with a pinion 302 rigid with the sleeve 261' (FIG. 21). When the clutch 46 (FIG. 24) is deenergized, the shaft 265 remains stationary. When the clutch 46 is energized, the shaft 265 revolves at 20 r.p.m.

The shaft 266 controls the cams 22 and 23 controlling in their turn the movement of the handle 20 of the clippers T along the curve $f$ (FIG. 3). The shaft 266 (FIG. 24) forms one of the components of the clutch 47, of which the other component is constituted by a drum 303, which latter is rigid with a pinion 304 meshing with a pinion 305 rigid with the sleeve 256 (FIG. 21). When the clutch 47 (FIG. 24) is deenergized, the shaft 266 is stationary. When the clutch 47 is energized, the shaft 266 revolves at 12 r.p.m.

As apparent more particularly from inspection of FIGS. 18 and 19, the shafts 261, 262, 263 and 264 are arranged at the four apieces of a square, while the shafts 265 and 266 are arranged respectively between the shafts 261 and 262 and between the shafts 263 and 264. The shafts 282 and 289 forming part of speed-reducing gears are arranged respectively between the shafts 263 and 264 with a slight lateral spacing and between the shafts 261 and 264 also with a slight lateral spacing.

The shafts 240, 261, 262, 265 and 266 pass out of the change speed gear G3 and are directed downwardly so as to control the parts of the station L and of the system N $B=P=T$, as will be disclosed hereinafter.

The shaft 240 (FIG. 29) carries a bevel pinion 405 meshing with a further bevel pinion 406 which is loosely carried by the shaft 407 of a tool holder. 408 designates the bearings for the shaft 407 carried in arms 409 secured to the plate 313. The pinion 406 meshes with a pinion 410 rigid with a shaft 411 provided with a square section 412 (FIGS. 29 and 30). The shaft 411 is revolvably carried at 413 inside a part 414 revolvably carried at 415 by the shaft 407. The part 414 is provided with a tubular tail-piece 416 around which is slidingly mounted the handle 20 of the clippers T. The tail-piece 416 is provided with a longitudinal rib 419 (FIG. 30) engaging a corresponding groove in the handle 20, so as to prevent the parts 416 and 20 from revolving with reference to each other. Inside the tail-piece 416 is fitted a socket 420 in which is fitted in its turn the square end piece 412 of the shaft 411.

At its lower end, the socket 420 is provided with a pin 421 (FIGS. 27, 28 and 29) which engages a fork 422. The latter controls through a mechanism 422a of a type known per se, the reciprocation of the upper movable toothed section 21 of the clippers T, of which the lower stationary section is shown at 424.

The revolvable part 414 (FIGS. 27 and 32) is controlled in its pivotal movement around the shaft 407 by means of a pin 430 engaging the groove of the cam 23 which is formed in a wheel 432. The latter is rigid with a shaft 433 parallel with the shaft 407. 434 designates in FIG. 32 the bearings for the shaft 433 which are formed by supports 435 secured underneath the plate 313.

The shaft 433 carries a pinion 436 meshing with an identical pinion 437 rigid with the shaft 407, whereby the two shafts revolve at the same speed and in opposite directions. The shaft 407 carries a wheel 438 inside which is provided the cam groove 22. Inside said groove is fitted a pin 440 rigid with the handle 20 of the clippers T. The shafts 407 and 433 are driven into rotation starting from the shaft 266 of the change speed gear G3. To this end, the shaft 266 carries a bevel pinion 441 which meshes with a bevel pinion 442 rigid with the shaft 407 (FIGS. 29 and 32).

When the shaft 266 revolves, the associated rotation of the two cams 22 and 23 causes the handle 20 of the clippers T to move along a path such that during the forward progression, the upper and lower toothed sections 423 and 424 carrying the clipper teeth 21 describe the curve $f$ (FIG. 3) until they reach the upper position drawn in dot-and-dash lines in FIG. 3, while the return movement extends down to the lower position drawn in solid lines in FIG. 3.

The shaft 261 defining the parameter $e$ (FIG. 27) carries a pinion 450 meshing with a pinion 451. The pinion 451 is rigid with a pinion 452 meshing with a rack 453. The latter is rigid with two lateral rods 455 (FIGS. 16, 27 and 28) arranged to either side of the clippers T and guided translationally in the slideways 456. The two rods 455 are provided endwise with small projections 457 forming feelers and adapted to remain in contact with the scalp V, while holding the clippers T spaced from the latter by an amount defined by the parameter $e$.

The shaft 262 corresponding to the parameter $k$ which defines the operation of the clippers at a predetermined point of the curve $f$ drives a sleeve 460 (FIGS. 31 and 32) mounted loose around the shaft 433, this being provided through the speed-reducing gearing 461, 462, 463 and 464. The sleeve 460 is rigid with a lever 465 which is thus allowed to revolve around the shaft 433. The lever 465 carries two miniature switches 466 and 467 (see also the wiring diagram of FIG. 6), of which the associated lead are shown respectively at 468–469 and 470–471. The miniature switches 466 and 467 cooperate with the two wheels 472 and 473 rigid with the shaft 433, the former wheel being provided with a boss 474 for actuating the miniature switch 466, while the second wheel is provided with a boss 475 for actuating the miniature switch 467. The boss 474 is located slightly to the front of the boss 475.

The miniature switch 467 actuated by the boss 475 allows defining, through the angular position of the lever 465, the parameter $k$, that is the point K of the curve $f$ at which the clippers begin operating (FIG. 3).

The miniature switch 466, actuated by the boss 474 slightly before the actuation of the miniature switch 467 by the boss 475, controls the operation of the locking counter-comb 480 (FIG. 27). Said counter-comb 480 is pivotally secured at 481 to the handle 20 of the clippers T. It is urged by a spring 482 into a lowered position for which its lower toothed sections 483 cap the stationary section 424 carrying the lower teeth 21 of the clippers T, whereby it is possible to enclose and to hold between the parts 424 and 483 the hair which is to be cut by the clippers T.

The counter-comb 480 is normally held in its raised inoperative position by means of a hook 484 cooperating with a further hook 485 pivotally secured to the core 486 of the electro-magnet 487 (FIGS. 6 and 27). The electromagnet 487 is carried by the clippers T and is fed through the lead 469 associated with the miniature switch 466. The energization of the electromagnet 487 has for its result to release the hooks 484 and 485 and to allow the counter-comb 480 into its locking position over the stationary teeth 424 under the action of the spring 482. As the clippers T rise along the curve $f$, the counter-comb 480 is carried along and rises, while remaining in contact with the stationary teeth 424, after which, the clippers T having reached the upper end of the curve $f$, the support for the hook 484 abuts at 484b against a pin 484a which is rigid with the implement carrier B, so that the hook 484 is engaged over the hook 485; henceforward, the counter-comb 480 remains released with reference to the teeth of the clippers T. It will be remarked that the arrangement of the boss 474 slightly ahead of the boss 475, allows releasing the counter-comb 480 at the exact moment at which the lock of hair is to be cut.

The shaft 265 (FIGS. 29 and 32) which controls the trimming comb P, carries a pinion 490 meshing with a pinion 491 mounted loose on the shaft 407. The pinion 491 drives through the pinions 492, 493, 494 the eccentric member 19 carrying a pin 496 (FIGS. 27 and 32). On said pin is fitted the handle 497 of the trimming comb P, of which the teeth are shown at 498. The upper end of said handle 497 forms a fork 499 fitted over the stationary pin 19a. The trimming comb P moves over an elliptic path including a forward stroke at $p1$ and a return stroke at $p2$.

In order to prevent the movable section 423 of the teeth 21 of the clippers T from stopping in a position where they clamp the hair of the patient at the moment at which the hair-cutting order has ceased and in order, furthermore, to prevent the forward and return movement of the system including the handle 20 of the clippers T from stopping in a position other than the lowermost position drawn in solid lines in FIG. 3 and, lastly, in order to prevent the trimming comb P from stopping in a position other than its upper inoperative position, means are provided for continuing the movement of the different parts starting from the moment at which the order of stopping the hair-cutting operation has been given, up to the moment at which the desired inoperative positions are reached, to wit: a position for which the teeth on the upper and lower sections of the clippers register in a manner such that the clipper teeth do not risk tearing off any tuft of hair, a lower position for the handle 20 of the clippers T and an upper position for the trimming comb.

Said means include the further lead 510 referred to hereinabove (FIG. 6) connected directly with the point 27 without passing through the program-defining means R and feeding the following parts: the cut-controlling clutch 52 through the miniature switch 52', the clutch 47 controlling the cams 22 and 23 through the miniature switch 47' and the clutch 46 controlling the trimming comb P through the miniature switch 46'.

The different miniature switches 46', 47' and 52' are controlled respectively by wheels associated with the movements to be controlled by them and provided with actuating bosses.

FIGS. 27 and 32 show at 514 the boss-carrying wheel associated with the miniature switch 52' of the clutch 52 controlling the hair-cutting operation. The wheel 514 is rigid with the shaft 240. FIGS. 29 and 32 show at 520 the wheel associated with the miniature switch 47' controlling the cams 22 and 23. The wheel 520 is rigid with the shaft 407.

FIG. 32 shows at 530 the wheel associated with the miniature switch 46' controlling the trimming comb P, the wheel 530 being rigid with the wheel 19.

Furthermore, the machine is provided advantageously with suction means 600 (FIG. 27) for removing the waste cut hair as it is being cut.

For automatically cutting hair according to a predetermined style, the patient S is first subjected to an examination of his hair H. To this end, his head is held in a stationary position at a suitable point underneath an apparatus such as that shown in FIGS. 1 and 2, which serves however solely for defining the desired parameters corresponding to the style of cut desired for said patient. The operator decides then which is the best path to be followed by the implements P and T and he draws said path on a developed diagram of the head of the patient, together with indications of the parameters at each point. This being done, the operator transforms this first diagram by drawing on a second diagram the modifications of the parameters from one point to the next. Said modifications are then translated into useful lengths of the perforations 29 of the strip 28 in the progarm-defining means R and the constancy of any parameter is shown by lengths of the strip 28 devoid of any perforation, taking into account the knowledge of the different constant relationships between the modifications of the different parameters and the lengths of the perforations. Possibly, certain corrections due to clearances or to the inertia of the movable parts are incorporated with the program together with the precedingly disclosed modifications.

A program is thus available in the form of a perforated strip 28 which corresponds to the selected style of hairdressing of a particular client and which may be used as many times as may be desired.

When the hair cutting is to proceed, the strip 28 corresponding to a client S is inserted in the program defining means R of the machine. Care should be taken of adjusting all the parameters for a predetermined starting point and to also adjust the starting point of the program. The client S is seated in the armchair and should assume the same position as that he had assumed during the preparation of the program.

Whatever may be the style of cut which has been selected, it should be remarked that by modifying the parameter $t$, the implements P and T may occupy either a position near the scalp for which they are adapted to operate, or else, a position which is further removed from said scalp, either when it is desired to pass from one cutting area to another, or else, to allow a short pause, so that the client may relax. The nearest position or operative position in registry with any point of the scalp is defined by the parameter $e$. The client S will ascertain at every moment whether the mechanism is near the scalp or at a distance therefrom, as provided by the engagement or the disengagement of the feelers 457. During operation, the client will help by holding the feelers 457 in their contacting position, while refraining from any substantial movement of his head. In order to obtain a more adaptable operation, the feelers 457 or their stems 455, or else, the system including the latter and the clippers may be bestowed with a certain degree of elasticity. Furthermore, the correct positioning of the client may be furthered by yielding guides such as chin-rests and the like. When the patient feels that the mechanism is moving away from his scalp, he may relax for a short period until the mechanism comes nearer the scalp again, for continuing the hair-cutting operation.

In the case where the hair is to be cut short in a stubble, only the parameters $a$, $b$, $c$, $c'$, $e$, $t$ and possibly $d$ are of interest, the parameter $k$ being left aside. The clippers T remain always in their lower position illustrated in solid lines in FIG. 3 and they therefore do not describe the curve $f$. The trimming comb P is not used and may remain in its upper inoperative position and the same is the case for the countercomb 480 which remains also in its upper position. The strip 28 introduced into the program-defining means R is provided in addition to the perforations 29 relating to the parameters $a$, $b$, $c$, $c'$, $e$, $t$ and possibly $d$, with elongated perforations 29 corresponding to the miniature contact 56 which controls directly the clutch 52 corresponding to the cutting operation.

The clippers T cut thus permanently, while the implement carrier B follows the outline of the scalp of the patient S along a suitable path. The moments of cutting are separated only by periods of rest during which the clippers pass from one area to another under the action of the modification of the parameter $t$. It should also be remarked that my improved machine may be simplified in the case where it has to operate only for stubble hair cuts. In particular, the parts to be adjusted with reference to $k$, to $f$, P and the counter-comb 480 may be omitted.

For styles of hair cutting other than the stubble style, that is with hair lying more or less back and more or less long, all the parameters may serve, including the parameter $k$.

Before the beginning of the general hair cutting and/or before the beginning of the cut at various points, it is possible to operate with the trimming comb P in order to properly prepare the hair before its cutting. The operation of the comb P is controlled by a perforation 29 in the strip 28 which produces the energization of the clutch 46. The trimming comb P assumes then a reciprocatory movement during the forward stroke $p1$, of which it rakes the hair and puts it in order. When the order of actuation of the comb ceases at the end of the corresponding perforation 29 on the strip 28 registering with the associated miniature switch 56 of the program-defining means R, the comb P does not stop instantaneously in any position whatever, but, in contradistinction, and as provided by the associated wheel 530 controlling the miniature-maintaining switch 46', it continues its travel until it reaches its upper position in which it cannot disturb the following operative steps.

In contradistinction with the procedure provided for cutting the hair in stubble style, the actual cutting is controlled, in this case, no longer by the miniature switch 56 corresponding to the clutch 52 and the strip 28 does not show any perforation 29 corresponding to said miniature switch. The cutting order is given during the procedure which is started by a perforation in the strip 28 corresponding to the miniature switch 56 controlling the clutch 47 for actuation of the cams 22 and 23.

The parameter $k$ relating to the moment at which the cut begins, in accordance with the procedure thus started, at the point K of the curve $f$ followed by the clippers T under the control of the cams 22 and 23 and it is previously adjusted by the program-defining means through the clutches 40 and 41 which constrain the shaft 262 to revolve in either direction. This provides a rotation in either direction of the lever 465, with a view to positioning the switches 466 and 467 in a suitable manner with reference to the bosses 474 and 475.

When a perforation of the program-defining means appears in a position for which the clutch 47 corresponding to the cams 22 and 23 is energized as mentioned, said cams are started, so that the clippers T move along the curve *f*. The boss 474 actuates first the miniature switch 466, the electromagnet 487 is energized and releases the hooks 484 and 485 and the counter-comb 480 sinks over the stationary section 424 of the teeth 21 of the clippers, while it encloses and clamps the lock of hair which the clipper teeth had begun raising. A short time afterwards, and as soon as the boss 475 engages the miniature switch 467, the cut-controlling clutch 52 is energized and the movable section 423 of the teeth 21 on the clippers T begins a reciprocatory shearing movement with reference to the stationary section 424, so as to cut through the lock of hair which has been clamped in position.

Under the control of the cams 22 and 23, the handle 20 continues its upward movement along the curve *f* until a point at which the counter-comb 480 engages again at 484–485, while the electromagnet 487 is henceforward deenergized, this being followed by the movement of the counter-comb which returns into its inoperative position. It should be remarked that when the order of cutting the hair has ceased, as a consequence of the passage of the boss 475, the movable section 423 of the teeth 21 of the clippers T continues its movement by reason of the presence of the wheel 514 which holds the miniature switch 52' in its closed position, until the position is reached for which said sections 423 and 424 of the teeth 21 have their teeth registering with one another and risk no longer tearing off any hair. It should be noted also that the movement of the handle 20 of the clippers T is continued until its position of rest or inoperative position is reached, even if the perforation in the program-defining means corresponding to the clutch 46 is no longer operative, this being obtained through the wheel 520 which holds the miniature switch 47' in its closed position until the desired inoperative position is reached.

It should be lastly remarked that hair-cutting of a style different from stubble may be obtained in the same manner as such stubble hair with a simplified machine—that is a machine for which the parameters *k* and *f* are no longer to be considered and which is not provided with the combs P and 480—if means are used for raising the hair over the scalp such as a fixing lotion or an aerodynamic or electrostatic effect or the like.

What I claim is:

1. A hair-cutting machine comprising program-defining means, a frame, hair-cutting clippers, an outer hoop pivotally connected with the frame, an inner hoop pivotally secured to the outer hoop, a ring pivotally carried by the inner hoop, a casing pivotally carried by said ring, a carrier for the implements, said carrier being adapted to slide longitudinally of and revolvably carried by said casing, means controlling the operation of the implements and the relative position of the frame, hoops, ring, casing and carrier and controlled by the program-defining means to ensure the cutting of a client's hair in accordance with the program defined by the last-mentioned means.

2. A hair-cutting machine comprising program-defining means, a frame, hair-cutting clippers, and outer hoop pivotally connected with the frame, an inner hoop pivotally secured to the outer hoop, a ring pivotally carried by the inner hoop, a casing pivotally carried by said ring, a carrier for the clippers, said carrier being adapted to slide longitudinally of and revolvably carried by said casing, means controlling the operation of the clippers, the relative angular setting of the hoops with reference to each other and to the frame, the angular position of the casing with reference to the inner hoop in two orthogonal planes, the angular and longitudinal setting of the carrier with reference to the casing, the minimum spacing of the clippers with reference to the scalp of the client and controlled by the program-defining means, to make said clippers follow a predetermined path with reference to the client's scalp and to make the clipper teeth begin operating at a point on said path in accordance with the program defined by the program-defining means.

3. A hair-cutting machine comprising program-defining means, including a strip perforated in accordance with a predetermined program corresponding to a given client and defining a plurality of parameters governing a desired hair-cutting style for said client, a frame, hair-cutting implements, means movably connecting said implements with the frame, means controlling said implements and connecting means, a plurality of change speed gears, miniature switches controlled by the perforations in the strip, relays controlled by the corresponding switches and controlling the corresponding change speed gears, and means whereby the change speed gears control the operation of the implements and of the connecting means to ensure the cutting of a client's hair in accordance with the parameters defined by the strip perforations.

4. A hair-cutting machine comprising program-defining means, a frame, hair-cutting implements including clippers provided with upper and lower teeth, a locking counter-comb adapted to hold the hair between it and the lower clipper teeth and a trimming comb, means movably connecting said implements with the frame, means controlling said implements and connecting means and controlled by the program-defining means to ensure the cutting of a client's hair in accordance with the program defined by the last-mentioned means.

5. In a hair-cutting machine having a frame, a first member mounted on said frame for rotational movement around a first axis, a second member mounted on said first member for rotational movement around another axis of said first member perpendicular to said first axis, and a clipper carrier connected with said second member, the combination with said clipper carrier and said second member of connecting means therebetween constructed and arranged for universal movement of the clipper carrier with respect to the second member, program-defining means, and control means controlling all said movements and actuated by said program-defining means.

6. In a hair-cutting machine having a frame, a first member mounted on said frame for rotational movement around a first axis, a second member on said first member for rotational movement around another axis of said first member perpendicular to said first axis, and a clipper carrier connected with said second member, the combination with said clipper carrier and said second member of connecting means therebetween contructed and arranged for rotational movement of the clipper carrier with respect to the second member, program-defining means, and control means controlling all said movements and actuated by said program-defining means.

7. In a hair-cutting machine having a frame, a first member mounted on said frame for rotational movement around a first axis, a second member mounted on said first member for rotational movement around another axis of said first member perpendicular to said first axis, and a clipper carrier connected with said second member, the combination with said clipper carrier and said second member of connecting means therebetween constructed and arranged for longitudinal and universal movements of the clipper carrier with respect to the second member, program-defining means, and control means controlling all said movements and actuated by said program-defining means.

8. A hair-cutting machine comprising a frame, a clipper carrier, connecting means connecting said carrier with said frame for movement of said carrier with respect to said frame, program-defining means, control means controlling said movement and actuated by said program-defining means, a clipper carried by said carrier, said clipper having a support provided with stationary teeth and reciprocable teeth mounted on said support and adjacent to said stationary teeth, a first spindle means in said carrier, a member pivoted around said first spindle means, said support being slidably engaged with said member, a first cam means pivoted around said first spindle means, a first cam follower mounted on said support and engaged with said first cam means, a second spindle means in said carrier, a second cam means pivoted around said second spindle means, and a second cam follower mounted on said member and engaged with said second cam means, said control means controlling rotation of said first cam means around said first spindle means and rotation of said second cam means around said second spindle means whereby the clipper teeth move with respect to said carrier along a predetermined curve.

9. A hair-cutting machine comprising a frame, a clipper carrier, connecting means connecting said carrier with said frame for movement of said carrier with respect to said frame, program-defining means, control means controlling said movement and actuated by said program-defining means, a clipper carried by said carrier, said clipper having a support provided with stationary teeth and reciprocable teeth mounted on said support and adjacent to said stationary teeth, said reciprocable teeth having a rest position wherein they extend in register with said stationary teeth, said control means controlling reciprocate motion of said reciprocable teeth with respect to said stationary teeth, and safety means for restoring said reciprocable teeth in their rest position when said program-defining means makes said control means stop said reciprocate motion.

10. A hair-cutting machine comprising program-defining means, a frame, hair-cutting implements, an outer member pivotally connected with the frame, an inner member pivotally secured to the outer member, a casing, universal connecting means connecting said casing with said inner member, a carrier for the implements, said carrier being adapted to slide longitudinally of and revolvably carried by said casing, means controlling the operation of the implements and the relative position of the frame, members, casing and carrier and controlled by the program-defining means to ensure the cutting of a client's hair in accordance with the program defined by the last mentioned means.

11. A hair-cutting machine comprising a frame, hair-cutting implements, a plurality of connecting means connecting said implements to said frame for movement of said implements with respect to said frame, a plurality of stationary detecting means operatively associated with said connecting means respectively, a program-defining strip longitudinally movable opposite said detecting means and having tracks cooperating with said detecting means respectively, program element recordings along asid tracks, motor means for moving said connecting means and said strip, and clutch means between said motor means and said connecting means controlled by said detecting means whereby a clutch means is engaged when a corresponding recording reaches a corresponding detecting means and is disengaged when said recording leaves said detecting means.

12. A hair-cutting machine comprising a frame, a clipper connected with said frame, said clipper having a support provided with stationary teeth and reciprocable teeth mounted for reciprocating movement on said support in adjacent relation to said stationary teeth, control means for reciprocating said reciprocable teeth, stationary detecting means operatively associated with said control means, a program-defining strip longitudinally movable opposite said detecting means, program element recordings along said strip, motor means for driving said control means and said strip, and clutch means between said motor means and said control means actuated by said detecting means whereby said clutch means is engaged for initiating reciprocate motion of said reciprocable teeth when a recording reaches said detecting means and is disengaged for stopping reciprocate motion of said reciprocable teeth when said recording leaves said detecting means.

13. A hair-cutting machine comprising a frame, a clipper and trimming comb carrier, first connecting means connecting said carrier with said frame for movement of said carrier with respect to said frame, a clipper, second connecting means connecting said clipper with said carrier for movement of said clipper with respect to said carrier, a trimming comb, third connecting means connecting said comb with said carrier for movement of said comb with respect to said carrier, each of said clipper and said comb having a rest position, program-defining means, control means controlling all said movements and actuated by said program-defining means, and safety means for restoring said clipper and said comb in their rest position when said program-defining means makes said control means stop movements of said clipper and said comb with respect to said carrier.

References Cited by the Examiner
UNITED STATES PATENTS

| | | | |
|---|---|---|---|
| 2,363,208 | 11/1944 | Sulzer | 83—71 |
| 2,559,004 | 7/1951 | Brown et al. | 132—118 |
| 2,656,497 | 10/1953 | Schweighofer et al. | 318—162 X |
| 2,972,351 | 2/1961 | Morgan | 132—45 |

RICHARD A. GAUDET, *Primary Examiner.*

LOUIS J. DEMBO, *Examiner.*